United States Patent [19]
Tani

[11] Patent Number: 6,102,832
[45] Date of Patent: *Aug. 15, 2000

[54] VIRTUAL REALITY SIMULATION APPARATUS

[75] Inventor: Norimasa Tani, Osaka, Japan

[73] Assignee: Tani Shiraito, Osaka, Japan

[ * ] Notice: This patent is subject to a terminal disclaimer.

[21] Appl. No.: 08/907,025

[22] Filed: Aug. 6, 1997

[30] Foreign Application Priority Data

Aug. 8, 1996 [JP] Japan ..................................... 8-227418

[51] Int. Cl.$^7$ ..................................................... A63B 24/00
[52] U.S. Cl. .................................. 482/4; 482/52; 482/79; 482/902; 434/247
[58] Field of Search ................................ 73/488, 514.39, 73/865.6; 345/8, 158; 482/1, 4, 8, 9, 51, 52, 53, 54, 900, 902

[56] References Cited

U.S. PATENT DOCUMENTS

| | | | |
|---|---|---|---|
| 4,695,129 | 9/1987 | Faessen et al. | 350/96.25 |
| 5,577,981 | 11/1996 | Jarvik | 482/4 |
| 5,872,438 | 2/1999 | Roston | 318/568.11 |
| 5,902,214 | 5/1999 | Makikawa | 482/4 |
| 5,929,332 | 7/1999 | Brown | 73/172 |

FOREIGN PATENT DOCUMENTS 07200162A  8/1995  Japan .

*Primary Examiner*—Jessica J. Harrison
*Assistant Examiner*—Julie Kasick
*Attorney, Agent, or Firm*—Armstrong, Westerman, Hattori, McLeland, & Naughton

[57] ABSTRACT

A virtual reality simulation apparatus providing participants with simulations of horizontal walk and walk on slopes and steps with full reality in their feelings in their bodies. The apparatus comprises a walk surface mechanism including a pair of walk plates supporting a participant's feet, a foot bottom-position detecting device for detecting positions of feet-bottoms of the participant moved away from the walk plates, and a walk-plate horizontally-driving device, which horizontally shifts the walk plate, correspondingly to movements of the participant's feet, to cause the foot-bottom to be contacted on the walk plate and keep the participant's trunk in a fixed position. The apparatus has a miniature space and camera mechanism including a miniature space and a camera device which is movable in the miniature space to be placed in a direction imitating a view of the participant and take an image in the miniature space. A control device mixes a previously programmed image and an image taken by the miniature space and camera mechanism to transmit the composite image to an image display and show it to the participant, and controls the walk surface mechanism while causing the same to correspond to the images.

23 Claims, 18 Drawing Sheets

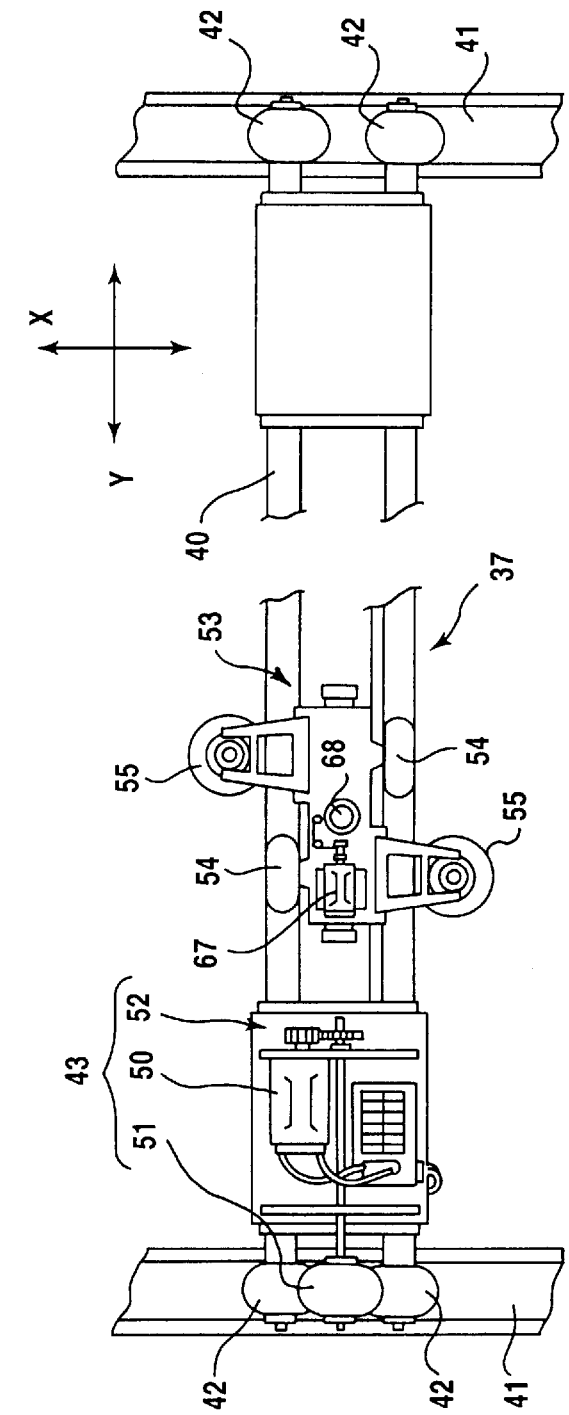
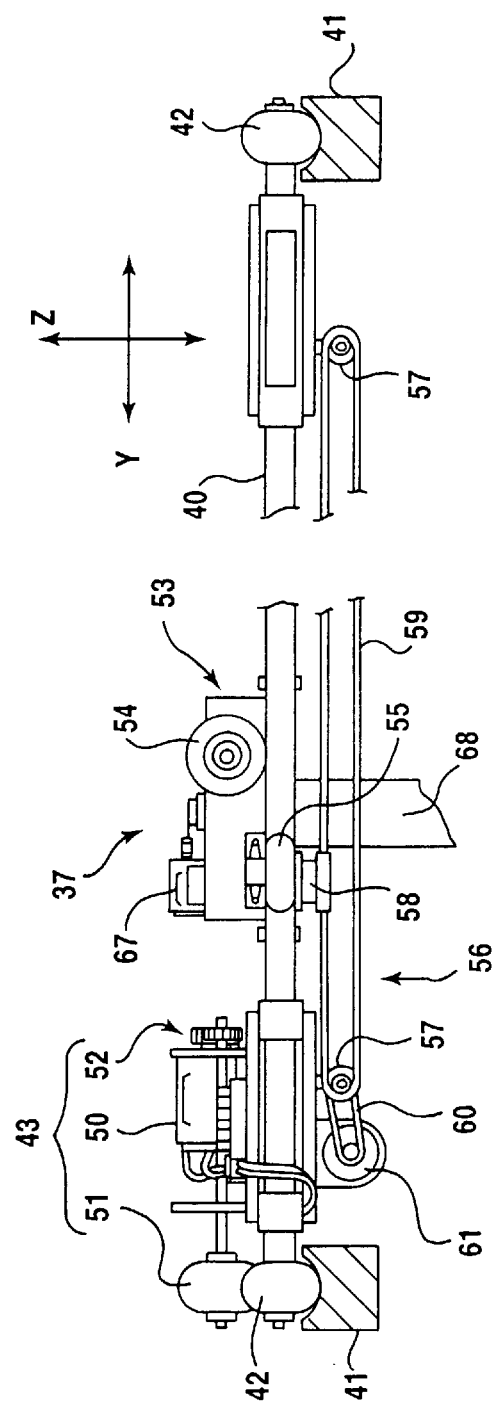
Fig.15(A)
Fig.15(B)

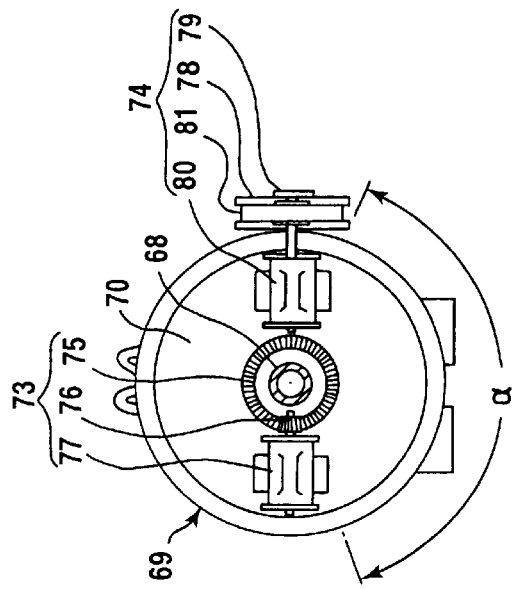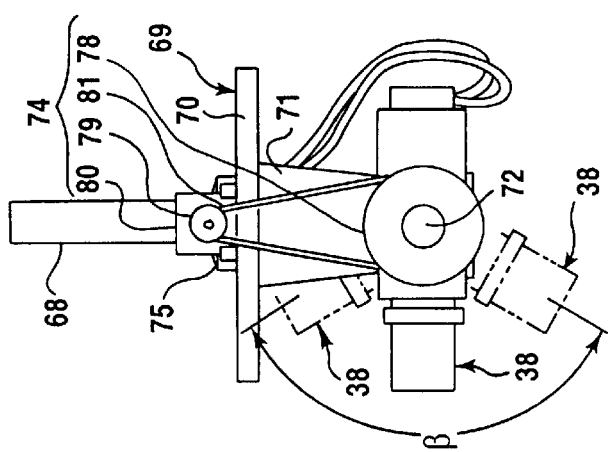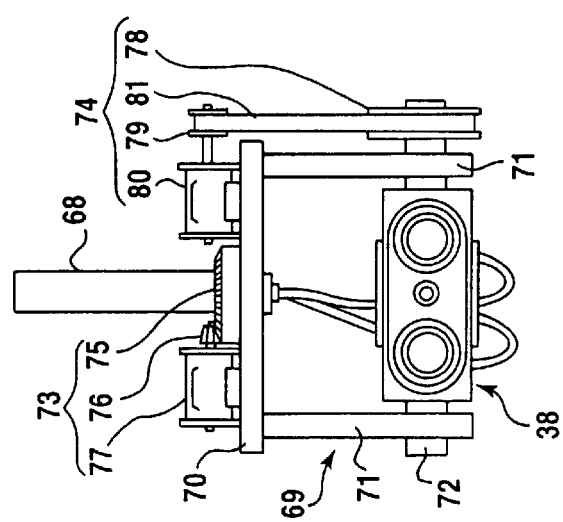

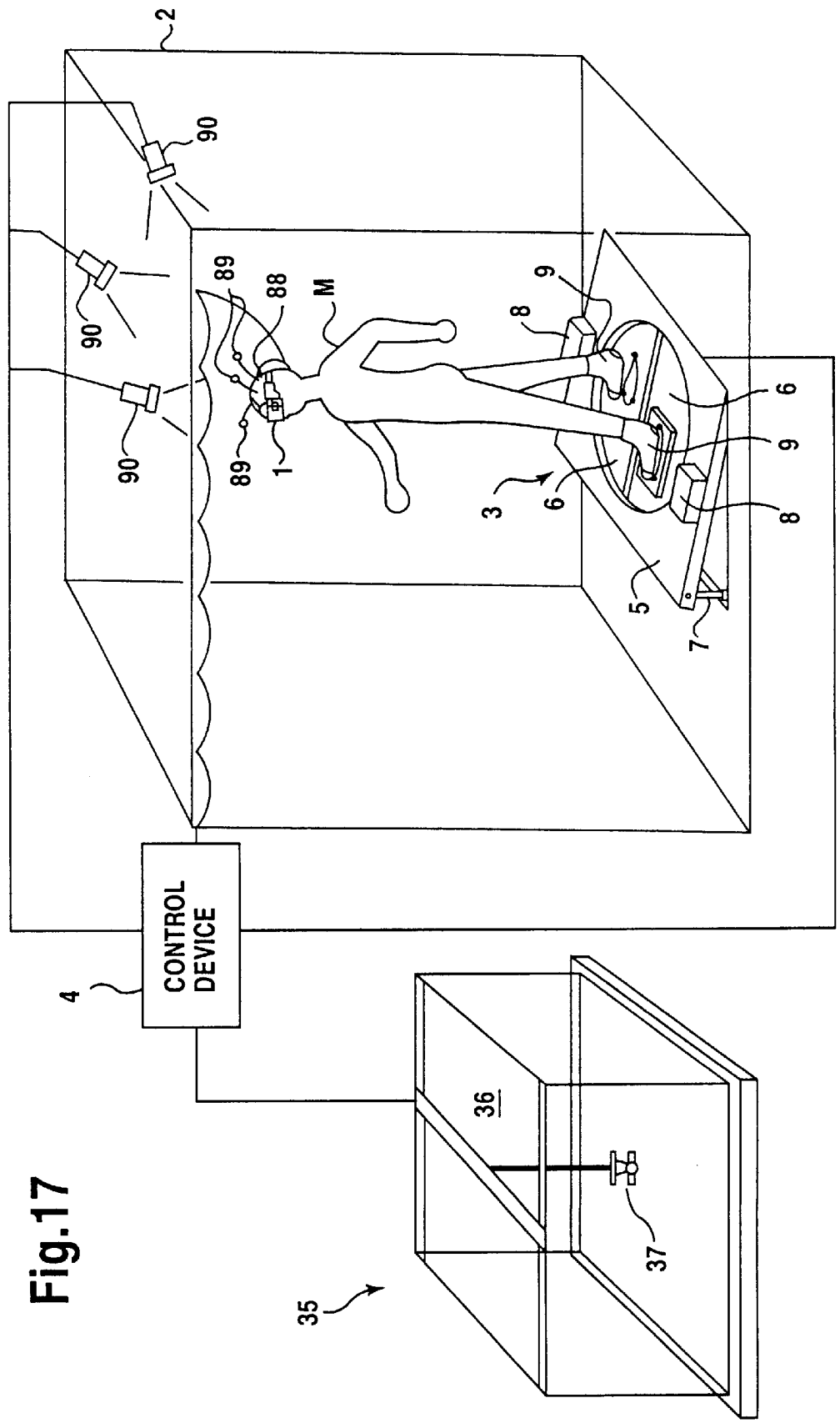

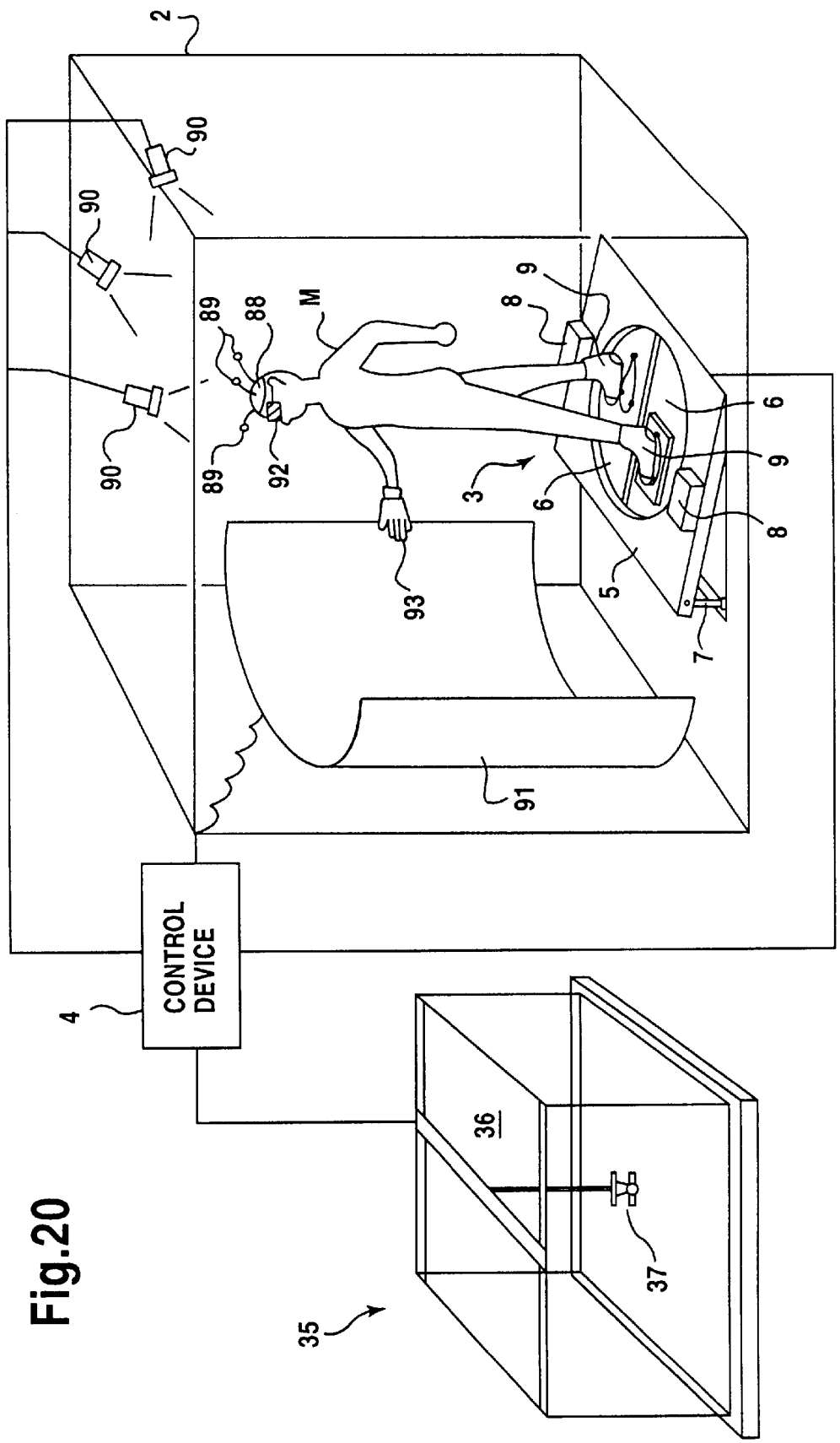

VIRTUAL REALITY SIMULATION APPARATUS

BACKGROUND OF THE INVENTION

1. Field of the Invention

The present invention relates to a virtual reality simulation apparatus which includes software of images easily prepared and fits or corresponds realistically to participants' motions or movements such as walking or running, and more particularly to a virtual reality simulation apparatus through which participants can have quasi experiences, with full reality, of walk in various directions and on slopes and steps while being positioned at the same position.

2. Description of the Prior Art

Various types of virtual reality simulation apparatuses have been hitherto developed, for example or particularly for game machines and devices, wherein a participant mounts on his or her head a head-mounted display (called "HMD" hereunder) and watches and listens to a three-dimensional image prepared by computer graphics.

Most of those apparatuses cause the participant to be kept in sitting upon watching and listening to the three-dimensional image on the HMD. The participant does not make a walk motion or movement or the like and thereby does not feel reality in use of the apparatuses.

A different conventional apparatus causes the participant to stamp his or her feet at the same position or make a walk motion in a single direction on a conveyer belt so as to synchronize the walk motion and the three-dimensional image. It is hard for the participant to feel in his or her body a reality in use of the apparatus (Japanese Unexamined Patent Application No. 7-200162 (1995)).

Moreover, some of the conventional virtual reality simulation apparatuses provide a three-dimensional image which changes correspondingly to the participant's moving forward and backward, or the like. However, an extent of movement of the participant is limited to a narrow range.

Furthermore, the image software used in the conventional virtual reality simulation apparatuses which is prepared by the computer graphics is quite expensive to produce, which obstructs practical use of the apparatus.

SUMMARY OF THE INVENTION

An object of the present invention is to provide a virtual reality simulation apparatus which overcomes the above problems and provides users or participants with walk experiences with full reality as actually walking on an actual walk surface including a horizontal surface, slopes and steps.

A further object of the present invention is to provide a virtual reality simulation apparatus which allows users to have walk experiences while being placed at a fixed or the same position.

A yet further object of the present invention is to provide a virtual reality simulation apparatus at a low cost wherein software of image to be used in the apparatus is simplified in production.

A further object of the present invention is to provide a virtual reality simulation apparatus at a low cost.

Those objects can be accomplished by the present invention described hereunder.

The virtual reality simulation apparatus according to the present invention comprises:

an image display showing participants programmed images;

a walk surface mechanism which has a function of detecting a foot-bottom position of a participant, and a function of performing a horizontal walk simulation in which left and right walk plates, on which left and right feet of the participant are placed separately, are individually horizontally shifted forward, backward, leftward and rightward, a simulation of walk on slopes in which the left and right walk plates are individually slanted, and a simulation of walk on steps in which the left and right walk plates are individually raised or lowered; and a control device which transmits the programmed images to the image display and controls the walk surface mechanism while causing the same to correspond to the programmed images.

According to the invention, the participant can make a walk motion or movement in various directions at the same position and also have quasi experiences of walk on slopes and steps. Thus, the invention enables the participants to experience virtual reality simulations with full reality.

The walk surface mechanism may preferably comprise the left and right walk plates and a walk-plate drive connected to and supporting the walk plates, and preferably the walk-plate drive may be disposed in a pit formed on a floor of a play room. In addition, the walk plates may preferably have a foot-position regulating frame for regulating the participant's feet in a predetermined position.

The walk surface mechanism may be provided with a foot bottom-position detecting means which is for detecting positions of feet bottoms of the participants and may preferably comprise a signal transmission member provided on each of left and right shoes to be put on by participants and a sensor which is mounted on each of the left and right walk plates to receive signals from the signal transmission member. The signal transmission member may employ a signal transmission member which transmits an ultrasonic signal.

The walk-plate drive includes a horizontally-driving means for shifting each of the left and right walk plates individually and horizontally forward, backward, leftward and rightward, a slantwise-driving means for slanting each of the left and right walk plates individually and slantwise forward, backward, leftward and rightward, and a raising and lowering means for raising and lowering each of the left and right walk plates individually. The raising and lowering means for the walk plates may employ a raising and lowering cylinder which changes the height of the left and right walk plates individually. Further, the horizontally-driving means may comprise a rotation cylinder fit to a piston rod of the raising and lowering means, a swinging cylinder for swinging the raising and lowering means forward and backward, and a swinging cylinder for swinging the raising and lowering means leftward and rightward. The slantwise-driving means may comprise a longitudinally swinging cylinder and a widthwise swinging cylinder for swinging the walk plates in their longitudinal direction and widthwise respectively.

The walk surface mechanism may preferably include a walk base plate freely tilted, the left and right walk plates held by the walk base plate as being capable of being freely horizontally shiftable and rotatable, and a walk-plate slantwise-driving means which supports one end of the walk base plate.

The walk surface mechanism may include the left and right walk plates, a walk-plate support base supporting each walk plate, and a walk-plate horizontally-driving means for horizontally shifting the walk plate support bases, the horizontally-driving means including a bendable linkage mechanism and a rotation cylinder disposed at a joint in the linkage mechanism.

A virtual reality simulation apparatus according to the present invention in a modified embodiment comprises:

an image display showing images to participants;

a miniature space and camera mechanism provided with a miniature space imitating a space in which a participant moves virtually, and with a camera device which is freely shifted in the miniature space to be placed in a direction imitating a view of the participant and take an image in the miniature space; and a control device which transmits to the image display a previously programmed image, an image taken by the miniature space and camera mechanism or a composite image including the programmed image and the image taken by the miniature space and camera mechanism.

The image display is preferably a head-mounted display to be mounted on the head of participant.

According to the above feature, the participant can watch and listen to, on the image display, the previously programmed image, the image in the miniature space taken by the miniature space and camera mechanism, or any composite images including the programmed image and that taken by the miniature space and camera mechanism. Hence, the software of images to be used in the virtual reality simulations or experiences can be produced easily and at a low cost.

A virtual reality simulation apparatus according to the present invention in a further modified embodiment comprises:

an image display showing images to participants;

a walk surface mechanism including a pair of walk plates, which are shiftable at least forward, backward, leftward and rightward and support feet of a participant, a foot bottom-position detecting means for detecting positions of feet-bottoms of the participant moved away from the walk plates, a walk-plate horizontally-driving means, which shifts the walk plate to allow the foot-bottom of the participant to be placed in a predetermined position and direction on the walk plate and pulls back the walk plate, on which the foot-bottom has trodden or been contacted, toward a trunk of the participant correspondingly to kinds of exercises such as walk and running to keep the participant's trunk in a fixed or constant position, and a walk-plate slantwise-driving means which slants the walk plates to provide simulation of movement on slopes;

a miniature space and camera mechanism including a miniature space imitating a space in which the participant moves virtually, and a camera device which is freely movable in the miniature space to be placed in a direction imitating a view of the participant and take an image in the miniature space; and a control device which transmits to the image display a previously programmed image, an image taken by the miniature space and camera mechanism or a composite image including the programmed image and the image taken by the miniature space and camera mechanism, and controls the walk surface mechanism while causing the same to correspond to the images.

The image display is preferably a head-mounted display to be mounted on the head of the participant. The foot bottom-position detecting means of the walk surface mechanism may comprise a signal transmission member provided on shoes to be put on by the participant, and a sensor provided on the walk plates to receive signals from the signal transmission member. The walk surface mechanism may preferably have a walk-plate raising and lowering means for raising and lowering the walk plates individually to provide simulation of movement on steps.

According to the invention, the participant can make movements similar to actual walking correspondingly to the images and at the same position and have a quasi experience of movements on slopes correspondingly to the images, thereby enjoying simulation of virtual reality with full reality. In addition, a composite image including the previously programmed image and images taken by the miniature space and camera mechanism can be watched and listened to on the image display by the participant. Hence, the software of images can be produced easily and at a low cost.

A virtual reality simulation apparatus according to the present invention in a further modified embodiment comprises:

an image display showing images to participants;

a view-direction detecting means for detecting specific directions of views of a participant;

a miniature space and camera mechanism including a miniature space imitating a space in which the participant moves virtually, and a camera device which is freely movable in the miniature space to be placed in a direction imitating a view of the participant and take an image in the miniature space; and a control device which transmits to the image display a previously programmed image, an image taken by the miniature space and camera mechanism or a composite image including the programmed image and the image taken by the miniature space and camera mechanism.

The view-direction detecting means may comprise a plurality of signal transmission members provided on a cap mounted on the head of the participant, and a plurality of sensors which are disposed above the head of the participant correspondingly to arrangement of the signal transmission members to receive signals from the corresponding transmission members.

The image display is preferably a head-mounted display to be mounted on the head of the participant, but may employ a multi-screen.

According to the above feature, the previously programmed images, images in the miniature space taken by the miniature space and camera mechanism correspondingly to the view of the participant, and any composite images including the programmed images and that taken by the miniature space and camera mechanism are watched and listened to on the image display. Hence, the software of images can be produced easily and at a low cost, and provision of watching and listening to images corresponding to movements of the participant enables a realistic experience or simulation of virtual reality. Furthermore, according to the above feature, the view-direction detecting means can be simply structured, and the images can be watched and listened to with a cheap apparatus.

Other various and characteristic structures and functions of the present invention will be further made apparent in the following examples described hereunder.

BRIEF DESCRIPTION OF THE DRAWINGS

FIG. 15(A) is a partially broken plan view of a camera-drive in the miniature space and camera mechanism and FIG. 15(B) a front view of the same.

FIG. 16(A) is a front view of a camera in the miniature space and camera mechanism, FIG. 16(B) a side view of the same, and FIG. 16(C) a plan view of the same.

FIG. 17 is a schematic explanatory view of a structure of a virtual reality simulation apparatus according to the present invention in a third embodiment.

FIG. 20 is a schematic explanatory view of a structure of a virtual reality simulation apparatus according to the present invention in a modified example.

DETAILED DESCRIPTION OF THE PREFERRED EMBODIMENT

Next, an example of the present invention will be detailed with referring to the accompanied drawings FIGS. 1 to 8.

Figure 1:
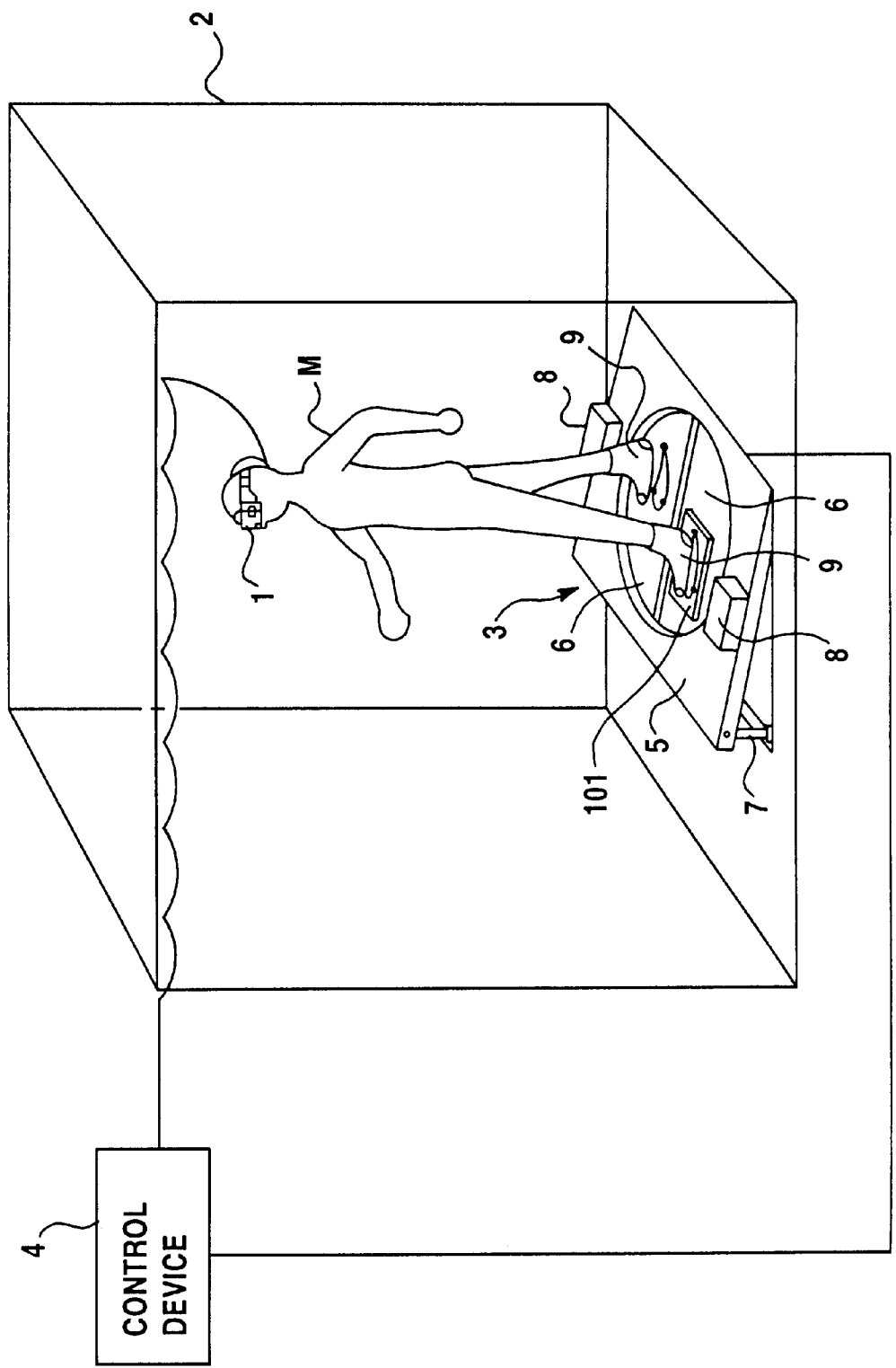
FIG. 1 is a schematic explanatory view showing a structure of a virtual reality simulation apparatus according to the present invention in a first embodiment.
Figure 2:
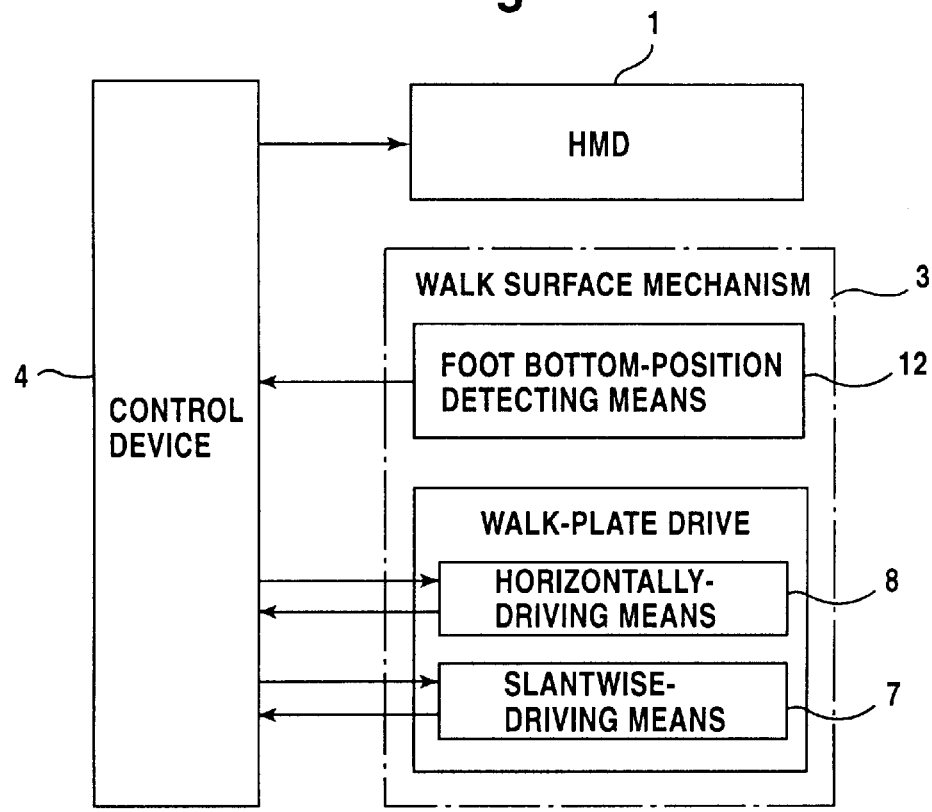
FIG. 2 is a block diagram showing a control system of the virtual reality simulation apparatus.
Figure 3:
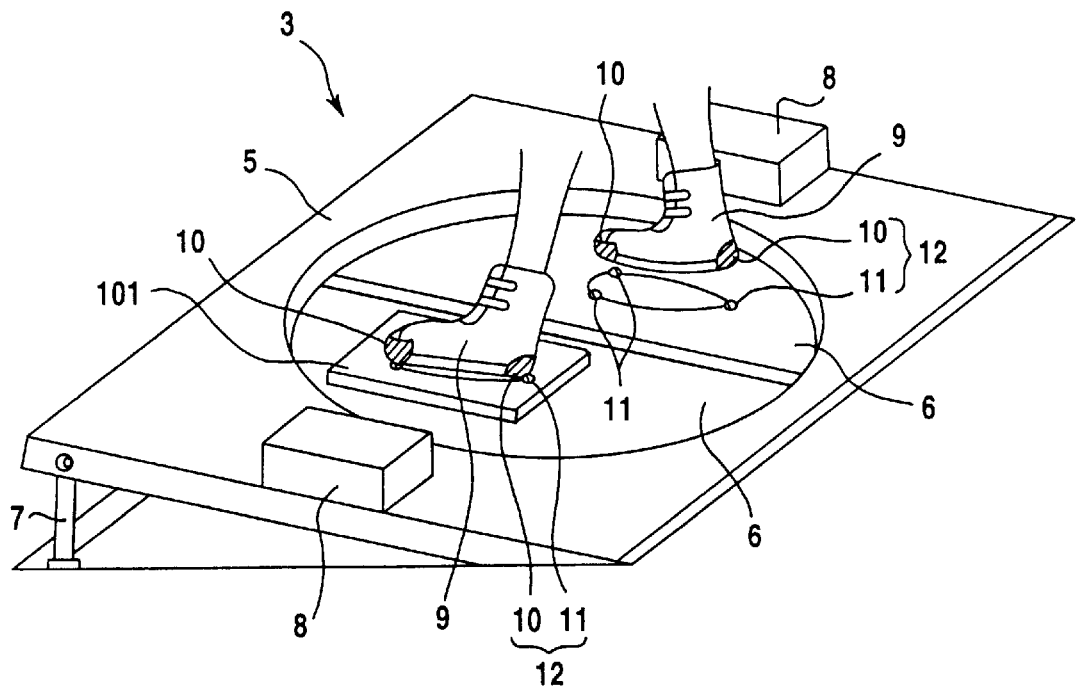
FIG. 3 is a perspective view of a walk surface mechanism in the same apparatus.
Figure 4A:
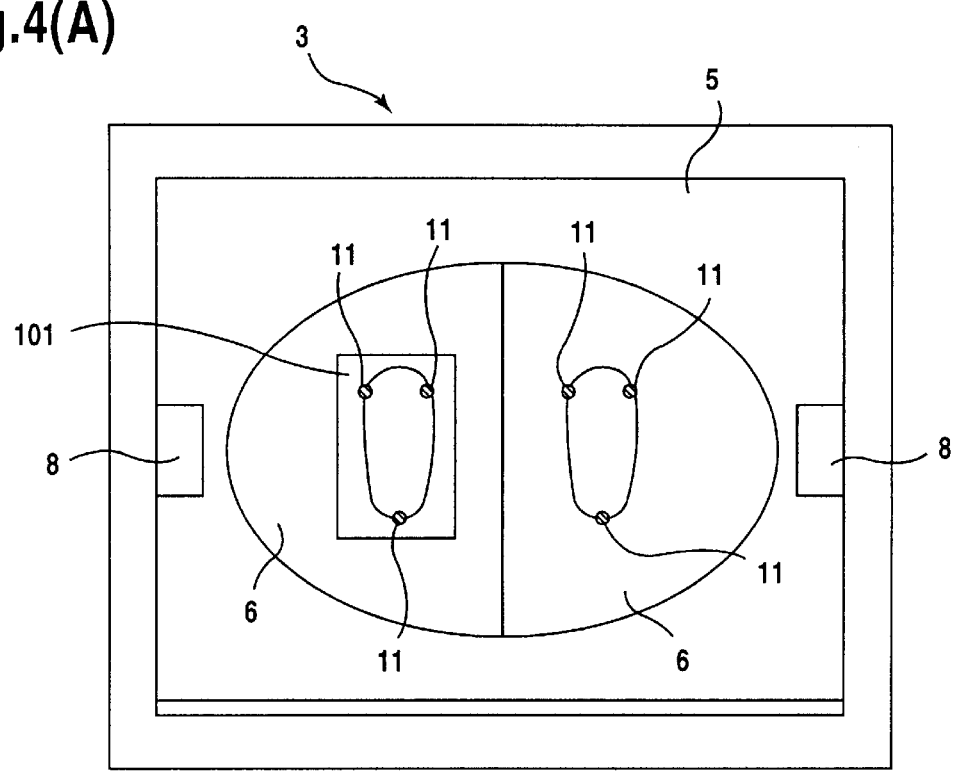
FIG. 4(A) is a plan view of the walk surface mechanism in the same apparatus.
Figure 4B:
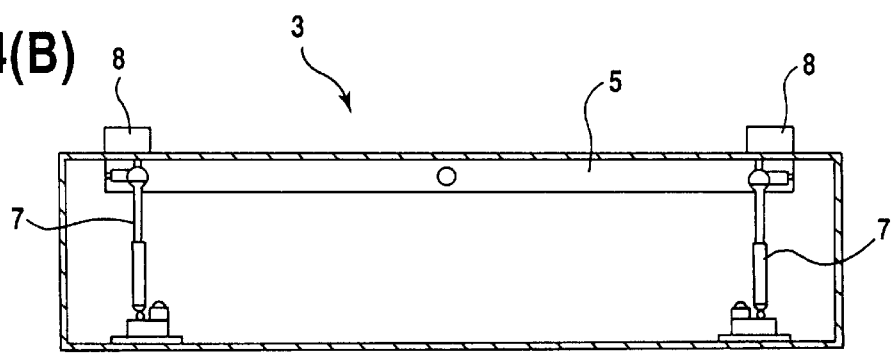
FIG. 4(B) a sectional rear view of the same.
Figure 4C:
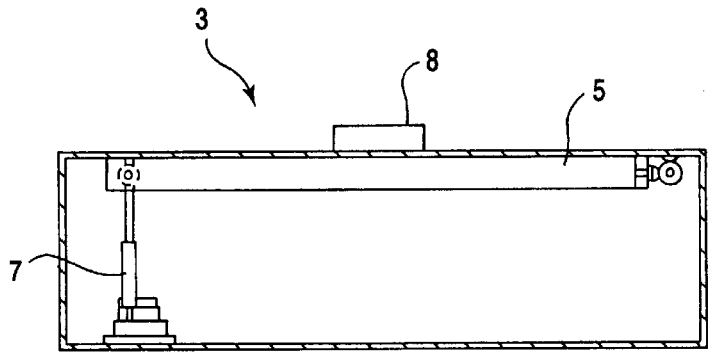
FIG. 4(C) a sectional side view of the same.

FIG. 1 schematically shows a structure of a virtual reality simulation apparatus according to the present invention in this example.

The virtual reality simulation apparatus has a head-mounted display(HMD) 1, which is an image display to show a participant M previously programmed images, a walk surface mechanism 3 arranged on a floor in a play room 2, and a control device 4 including CPU. The HMD 1 is put on by the participant M on the head and shows the participant M any images previously programmed in the control device 4, for example, images formed by computer graphics and shown in the form of three-dimensional images.

The walk surface mechanism 3 has a walk base plate 5 which is laid on the floor of the play room 2 as being freely tilted and is provided with a pair of walk plates 6, which support left and right feet of the participant M and are freely rotatable and shiftable forward, backward, leftward and rightward along the walk base plate 5. The walk base plate 5 is supported at one end by a slantwise-driving means 7 including a cylinder and other parts. The slantwise-driving means 7 is actuated to slant the base plate 5 together with the walk plates 6, thereby providing simulation of walking on slopes. The slantwise-driving means 7 is controlled by the control device 4 in such manner of being synchronized with an image transmitted from the control device 4 to the HMD 1. The left and right walk plates 6 are shifted forward, backward, leftward and rightward and rotated by means of a horizontally-driving means 8 arranged on the walk base plate 5 correspondingly to each walk plate 6. The horizontally-driving means 8 is controlled by the control device 4.

Figure 5A:
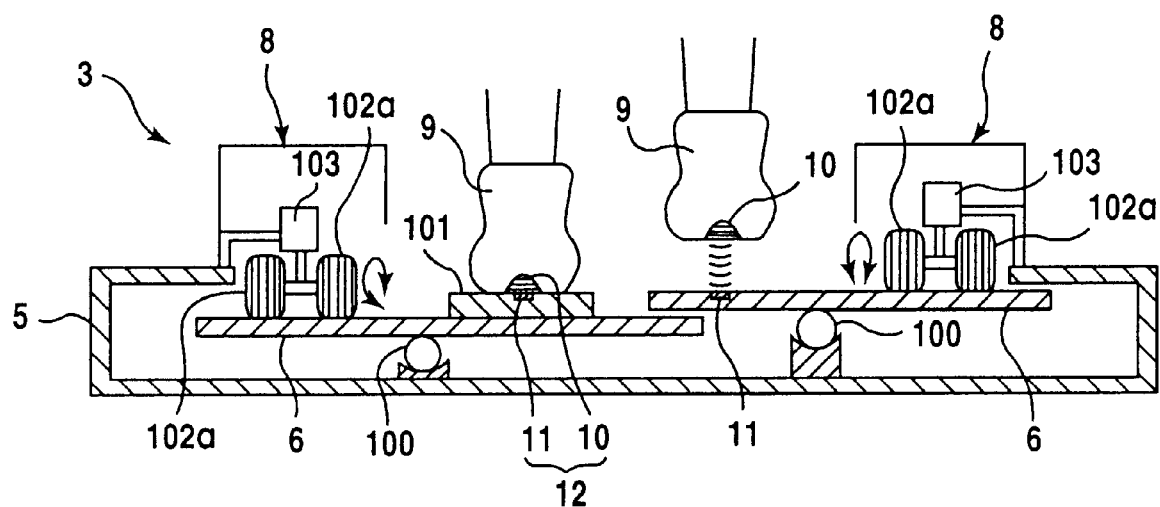
FIG. 5(A) is a longitudinal section of the walk surface mechanism.

FIG. 5(A), the longitudinally sectional view, shows the left and right walk plates 6 supported by free balls 100 disposed on the bottom of the base plate 5 as being freely rotatable. The walk plates 6 are different in height to each other by the extent of their thickness to thereby be prevented from interfering with each other. The low walk plate 6 is provided at its foot-supporting position with a treading plate 101 for height adjustment to offset the above height difference of the walk plates.

Figure 5B:
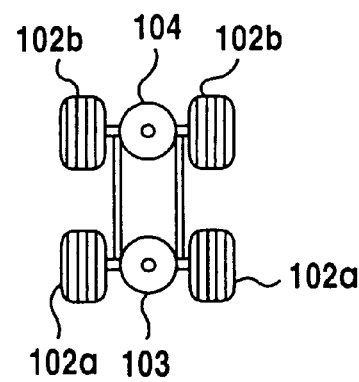
FIG. 5(B) a plan view of a walk-plate horizontally-driving means of the same.

The horizontally-driving means 8 for the walk plates 6 does, as seen in FIGS. 5(A) and 5(B), comprise a pair of rollers 102a for forward and backward movement and a pair of rollers 102b for rotation, the rollers 102a and 102b being in contact with the corresponding walk plates 6, and motors 103 and 104 driving to rotate the forward/backward movement rollers 102a and the rotation rollers 102b, respectively. Rotation of the left or right walk plate 6 is carried out by driving to rotate the left and right rotation rollers 102b at different rotational speed or number of revolutions per minute.

The participant M puts on shoes 9 and places his or her feet on the walk plates 6. The shoes 9 mount at predetermined points a plurality (three in this example) of signal transmission members 10 which transmit particular standard signals, which are preferably ultrasonic waves or may adopt other signal mediums such as line of magnetic force, infra-red rays, etc. A plurality (three in this example) of sensors 11 are provided on the walk plates 6 at a foot-supporting position, i.e., at specific points corresponding to the signal transmission members 10 on the shoes 9 which are placed on the walk plates 6 at the foot-supporting position. Each sensor 11 on the walk plate 6 receives the standard signal transmitted from the specific or corresponding signal transmission member 10 (on the shoe 9 moved away from the walk plate 6) to thereby detect specific positions of the foot bottom of the participant which has been moved away from the walk plate 6. Accordingly, the signal transmission members 10 at the shoes 9 and the sensors 11 on the walk plates 6 constitute a foot bottom-position detecting means 12. The walk-plate horizontally-driving means 8 functions to shift, on the basis of a detection result or output of the foot bottom-position detecting means 12, the walk plate 6 to allow the participant's foot-bottom to be placed in a predetermined position and direction on the walk plate 6, and also functions to pull back, correspondingly to kinds of exercises such as walking and running, the walk plate 6 (on which one of the feet of the participant, i.e., a foot bottom, has been placed or has trodden) toward the trunk of the participant M to thereby keep the participant's trunk in a constant or fixed position. These functions of the horizontally-driving means 8 are controlled by the control device 4.

According to the above virtual reality simulation apparatus, a previously programmed image is transmitted from the control device 4 to the HMD 1 on the head of participant M to allow the participant to watch and listen to the three-dimensional image. When the participant M makes a motion or movement, such as walk or running, correspondingly to the image, the horizontally-driving means 8 of the walk surface mechanism 3 functions so that each foot-bottom is brought always into a predetermined position on a corresponding walk plate 6, and the walk plate 6, on which the foot-bottom has trodden or been placed, is pulled back toward the participant's trunk to keep the trunk in a fixed or constant position. Hence, the participant can make the exercise such as walk or running correspondingly to the three-dimensional image and at the same position in a narrow space, and with enhanced reality in the participants' feelings in their bodies. Moreover, the walk-plate slantwise-driving means 7 of the walk surface mechanism 3 slants the walk plates 6 correspondingly to the three-dimensional images to provide a simulation of walk or running on slopes, thereby enabling a further realistic experience of virtual reality.

Figure 6:
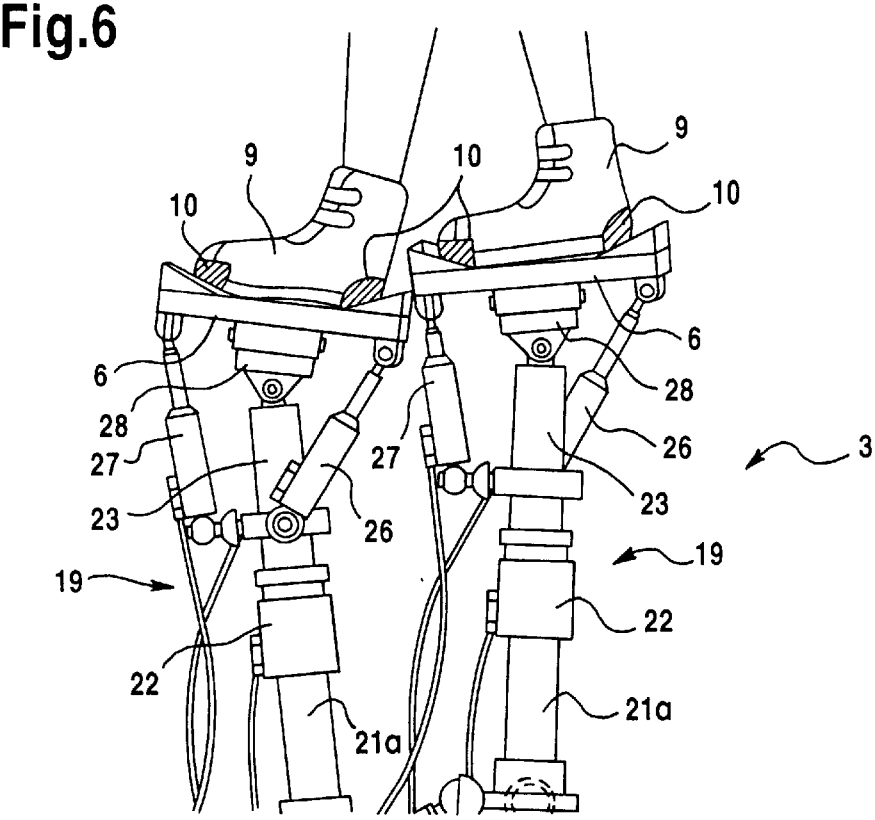
FIG. 6 is an explanatory view showing a walk surface mechanism in a modified example, being in use, of the same virtual reality simulation apparatus.
Figure 7:
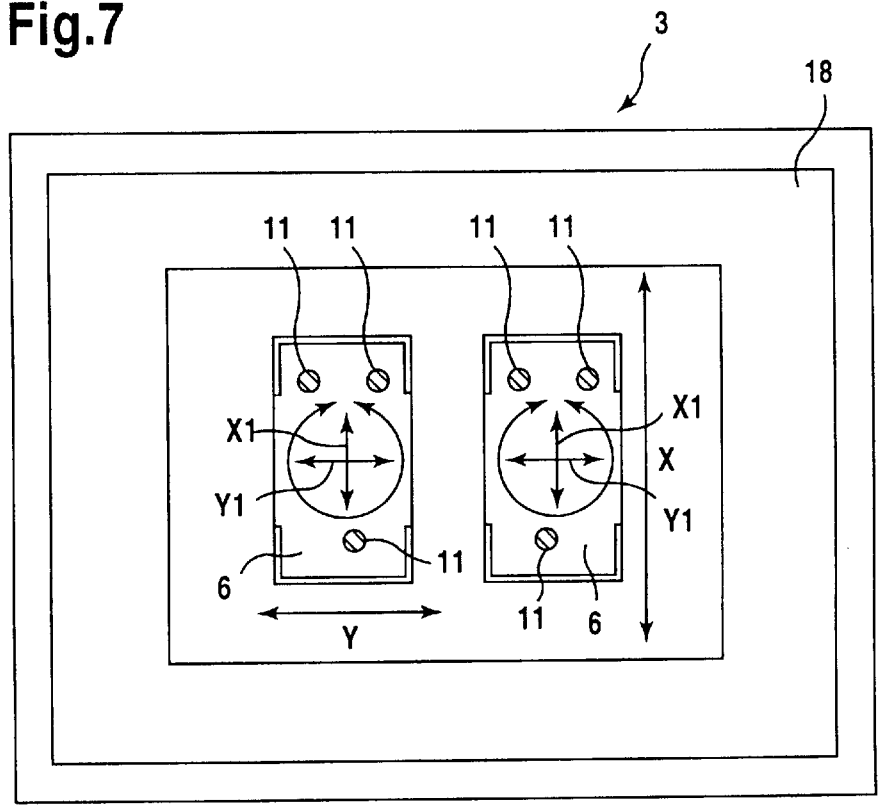
FIG. 7 is a plan view of the same walk surface mechanism.
Figure 8A:
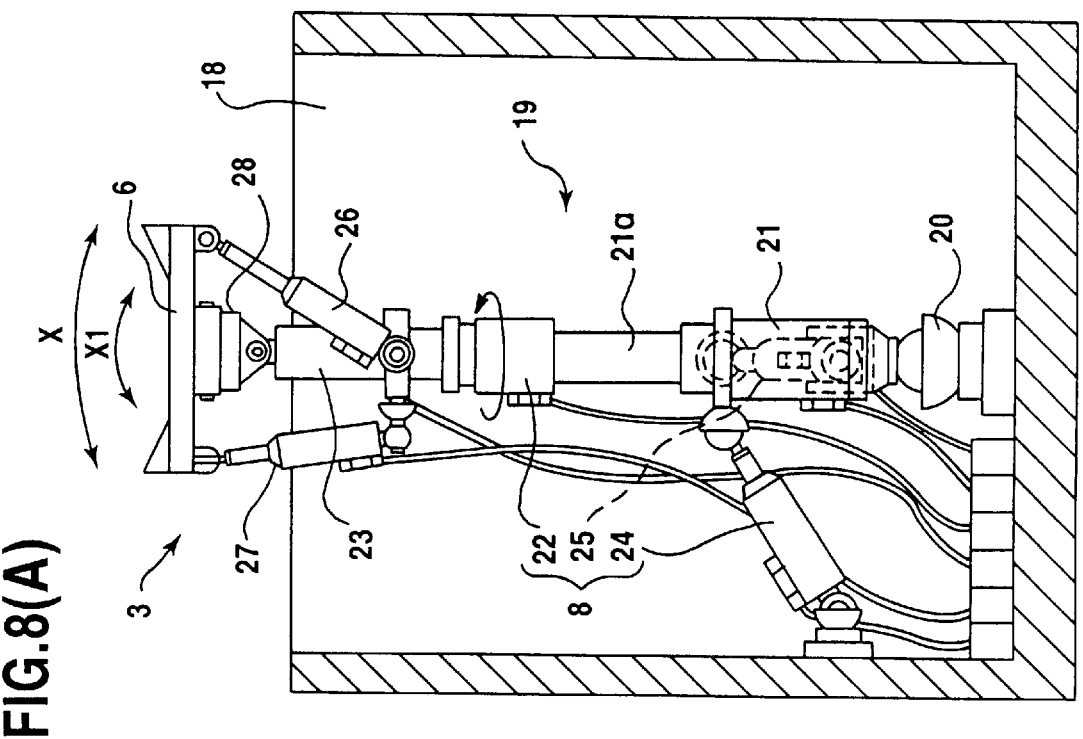
FIG. 8(A) is a sectional side view of the same walk surface mechanism.
Figure 8B:
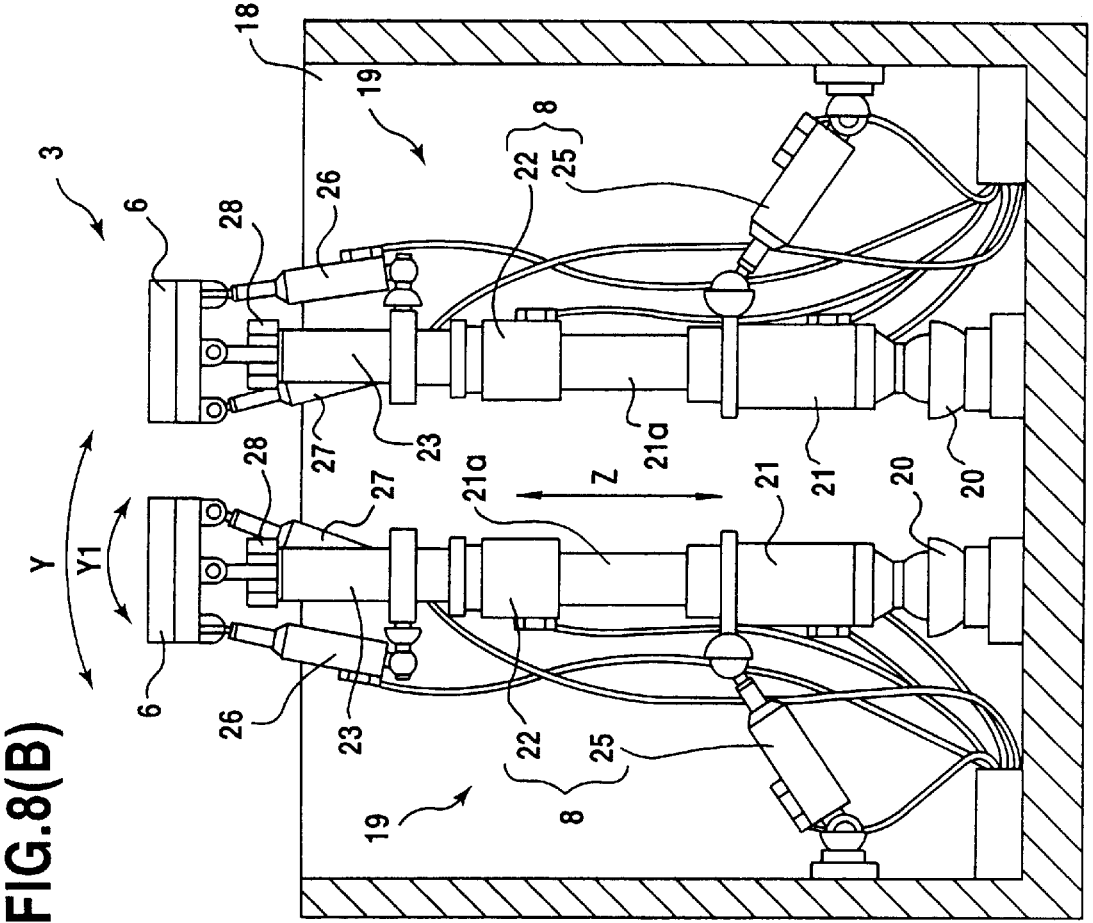
FIG. 8(B) a sectional rear view of the same.

FIGS. 6 to 8 show another example of the walk surface mechanism 3 in the above embodiment. The left and right walk plates 6 supporting the participant's feet are connected to and supported by a pair of walk-plate support means 19 which stand inside and project from a pit 18 formed on a floor of a play room 2. The walk-plate support means 19 comprises a raising and lowering cylinder 21 which stands on the bottom of the pit 18 through a universal joint 20, a rotation cylinder 22 fit to a piston rod 21a of the raising and lowering cylinder 21, a rotation rod 23 driven for rotation by the rotation cylinder 22, a forward and backward swinging cylinder 24 for swinging the raising and lowering cylinder 21 forward and backward (in the direction designated by X), a leftward and rightward swinging cylinder 25 for swinging the raising and lowering cylinder 21 leftward and rightward (in the direction Y), a longitudinally-swinging cylinder 26 and a widthwise-swinging cylinder 27, which are each connected between the rotation rod 23 and the walk plate 6 to swing the walk plate 6 in its longitudinal direction X1 and widthwise direction Y1, respectively. The rotation rod 23 is connected to the walk plate 6 through a universal joint 28. The signal transmission member 10 and sensor 11 forming the foot bottom-position detecting means 12 are each provided on shoes 9 and walk plates 6, respectively in the same manner as the foregoing walk surface mechanism 3.

In the walk surface mechanism 3 in this example, each walk plate 6 is rotated by driving of the rotation cylinder 22, shifted forward and backward by driving of the forward and backward swinging cylinder 24, and shifted leftward and rightward by driving of the leftward and rightward swinging cylinder 25. Accordingly, the rotation cylinder 22 and swinging cylinders 24 and 25 constitute the walk-plate horizontally-driving means 8 in the foregoing walk surface mechanism 3. Furthermore, the swinging cylinder 26 for swinging the walk plates 6 in their longitudinal direction has a function of providing a simulation of walk or running on slopes similarly to the walk-plate slantwise-driving means 7 in the foregoing walk surface mechanism 3. Moreover, the raising and lowering cylinder 21 may be driven to change the height of the walk plates 6, whereby providing a simulation of walk or running on steps.

Figure 9:
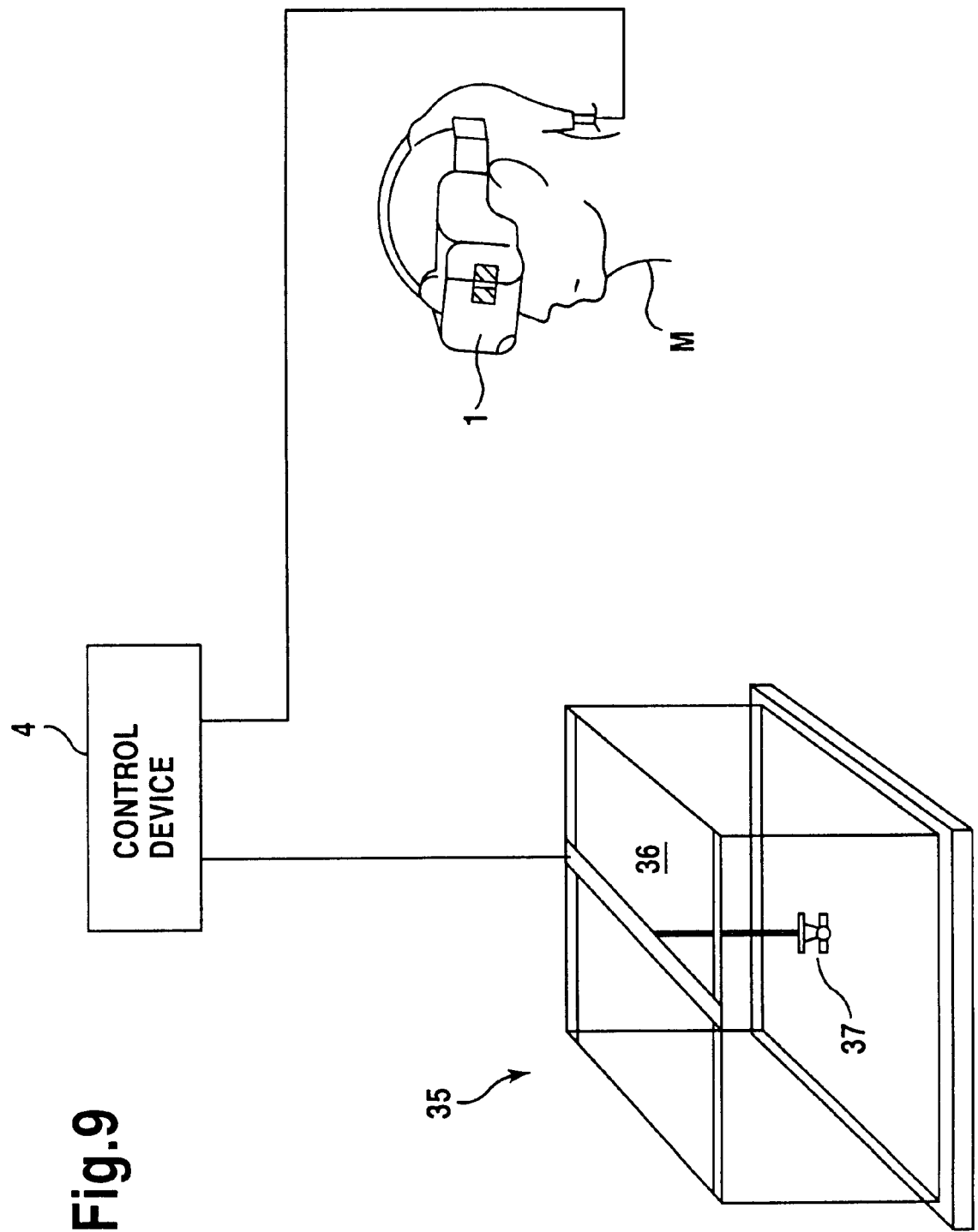
FIG. 9 is a schematic explanatory view of a structure of a virtual reality simulation apparatus according to the present invention in a second embodiment.
Figure 10:
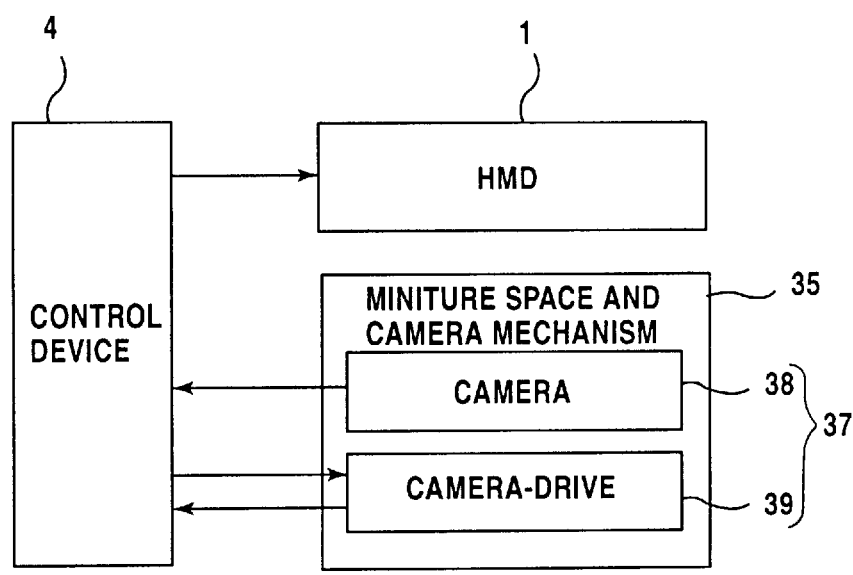
FIG. 10 is a block diagram showing a control system of the same apparatus.

Next, a second embodiment of the present invention will be detailed with referring to FIGS. 9 to 16. FIG. 9 schematically shows a structure of the virtual reality simulation apparatus in this embodiment. The apparatus comprises an image display 1 (HMD) showing an image to a participant M; a miniature space and camera mechanism 35; and a control device 4 which includes CPU and transmits to the HMD 1 a previously programmed image (e.g. an image prepared by computer graphics), a solid or three-dimensional image taken by the miniature space and camera mechanism 35, or a composite image mixing the programmed image with that solid or three-dimensional image taken by the mechanism 35. The control device 4 processes the composition of the images.

The miniature space and camera mechanism 35 includes a miniature space 36 imitating a space wherein the participant M moves virtually, and a camera device 37 which is freely movable in the miniature space 36 to be placed in a direction imitating view of the participant M and take a solid or three-dimensional image of a scene in the miniature space. The camera device 37 comprises a camera 38 for taking the three-dimensional images in the miniature space, and a camera-drive 39 for shifting the camera 38.

The camera-drive 39 is provided with a travel means 40 for shifting the camera 38 forward and backward (in the direction X) in the miniature space 36. The travel means 40 has at both ends wheels 42 which engage with guide rails 41 extending along both lateral edges of an upper opening of a casing forming the miniature space 36. The wheels 42 at one end of the travel means 40 are driven for rotation by a drive 43 provided on the travel means 40 to run the travel means 40 forward and backward. The drive 43 includes a motor 50, a roller 51 in surface contact with the wheels 42 and a transmission 52 transmitting torque of the motor 50 to the roller 51.

Another travel means 53 for shifting the camera 38 leftward and rightward (in the direction Y) in the miniature space 36 is mounted on the travel means 40. The travel means 53 has at lateral ends an upper guide roller 54 whose rotation axis extends horizontally and a side guide roller 55 whose rotation axis extends perpendicularly. The travel means 53 is mounted on the travel means 40 by the upper guide rollers 54, with the side guide rollers 55 sandwiching the travel means 40 to allow the travel means 53 to be shiftable stably leftward and rightward on the travel means 40. A drive 56 for the travel means 53 comprises an endless belt 59, which is stretched between a pair of pulleys 57 disposed at a lower part of the travel means 40 and is partially connected to a lower part of the travel means 53 by a connecting member 58, and a motor 61 for driving and rotating the pulley 57 by use of a timing belt 60.

The travel means 53 has a stretchable rod 68 which extends downward, is driven to be stretched (raised or lowered) by a motor 67 and mounts the camera 38 on a camera support 69 at a lower end of the rod 68. The raising and lowering-driving motor 67 drives to shift the camera 38 upwards and downwards (in the direction Z). The camera support 69 is rotatably connected, at the center of a base plate 70, to the stretchable rod 68. And the camera 38 is supported to a pair of brackets 71, which extend downward from the base plate 70, to be swingable up and down around a rotation axis 72. The camera 38 is driven by a leftward and rightward rotation means 73 to be swung leftward and rightward (at a swing angle: α) around the stretchable rod 68 as seen in FIG. 16(C), and also driven by an upward and downward rotation means 74 to be swung up and down (at a swing angle: β) as shown in FIG. 16(B).

The rotation means 73 includes a first bevel gear 75 fit coaxially to the stretchable rod 68, a second bevel gear 76 in mesh with the gear 75 and a motor 77 which is mounted on the base plate 70 of the camera support 69 to drive the second bevel gear 76. And the rotation means 74 comprises a pulley 78 fit to the rotation axis 72 of the camera 38, a motor 80 mounted on the base plate 70 and having a pulley 79 fit to an output shaft, and a timing belt 81 stretched between the pulleys 78 and 79.

According to the above virtual reality simulation apparatus, a previously programmed image and a three-dimensional image in the miniature space 36 taken by the camera device 37 are mixed or put together by the control device 4, and the participant M can watch and listen to the composite three-dimensional image on the HMD 1 mounted on the head. It is to be noted that the control device 4 is able to transmit to the HMD 1 only the programmed image or only the image taken by the miniature space and camera mechanism 35. Hence, the image software to be applied in the virtual reality simulation apparatus is easy and at a low cost to produce.

Figure 18:
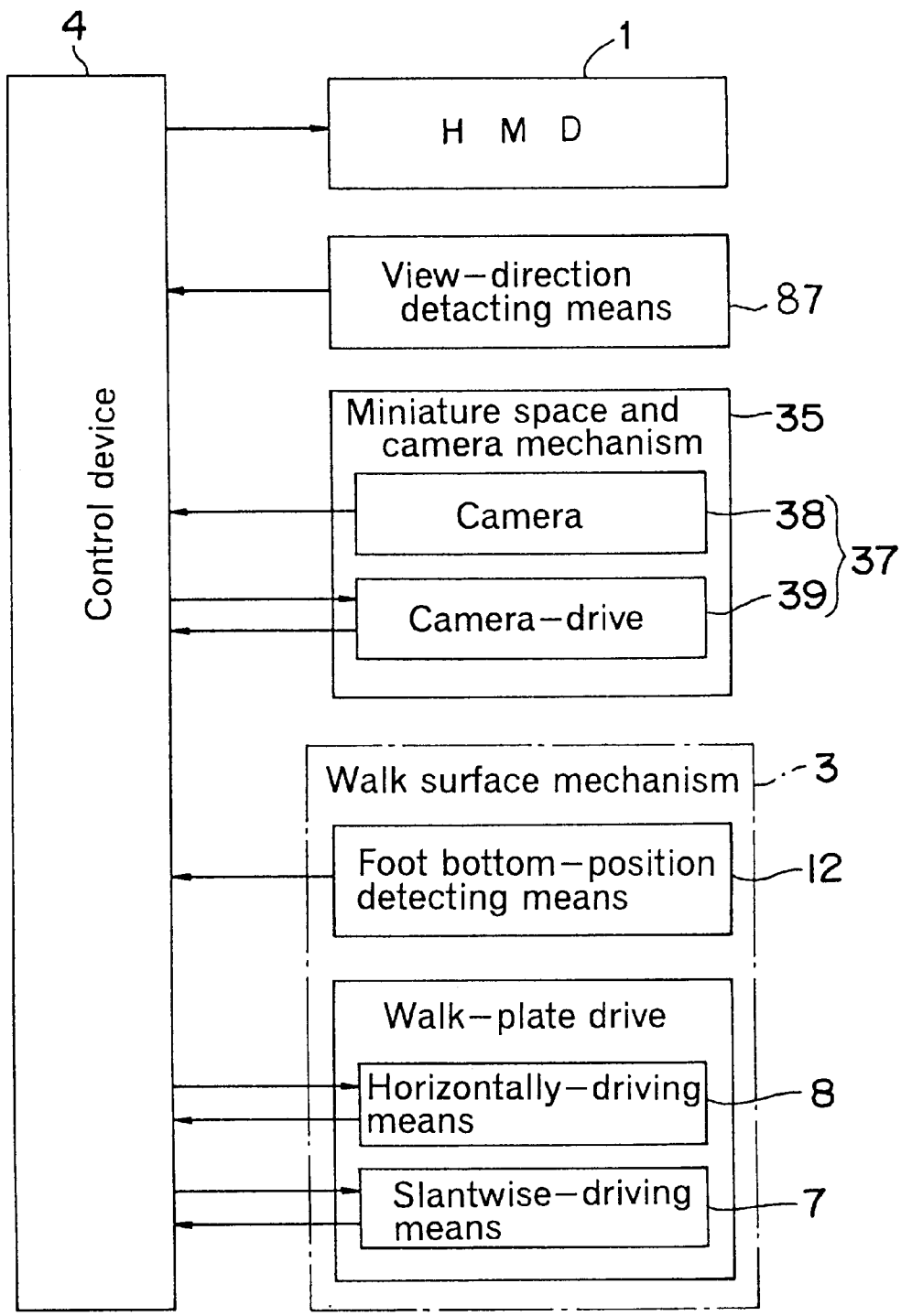
FIG. 18 is a block diagram showing a control system of the same apparatus.

Next, a third embodiment of the present invention will be detailed with referring to FIGS. 17 to 19. FIG. 17 schematically shows a structure of a virtual reality simulation apparatus in this example. The apparatus comprises a HMD 1, the image display, showing images to the participant M, a view-direction detecting means 87 for detecting specific directions of the participant's view, a walk surface mechanism 3 provided on a floor in a play room 2, a miniature space and camera mechanism 35, and a control device 4 which includes CPU; mixes or puts together a previously programmed image prepared, for example, by computer graphics and a image taken by the miniature space and camera mechanism 35 to transmit the composite image to the HMD 1; and controls the walk surface mechanism 3 while causing the same to correspond to the composite image.

Figure 11:
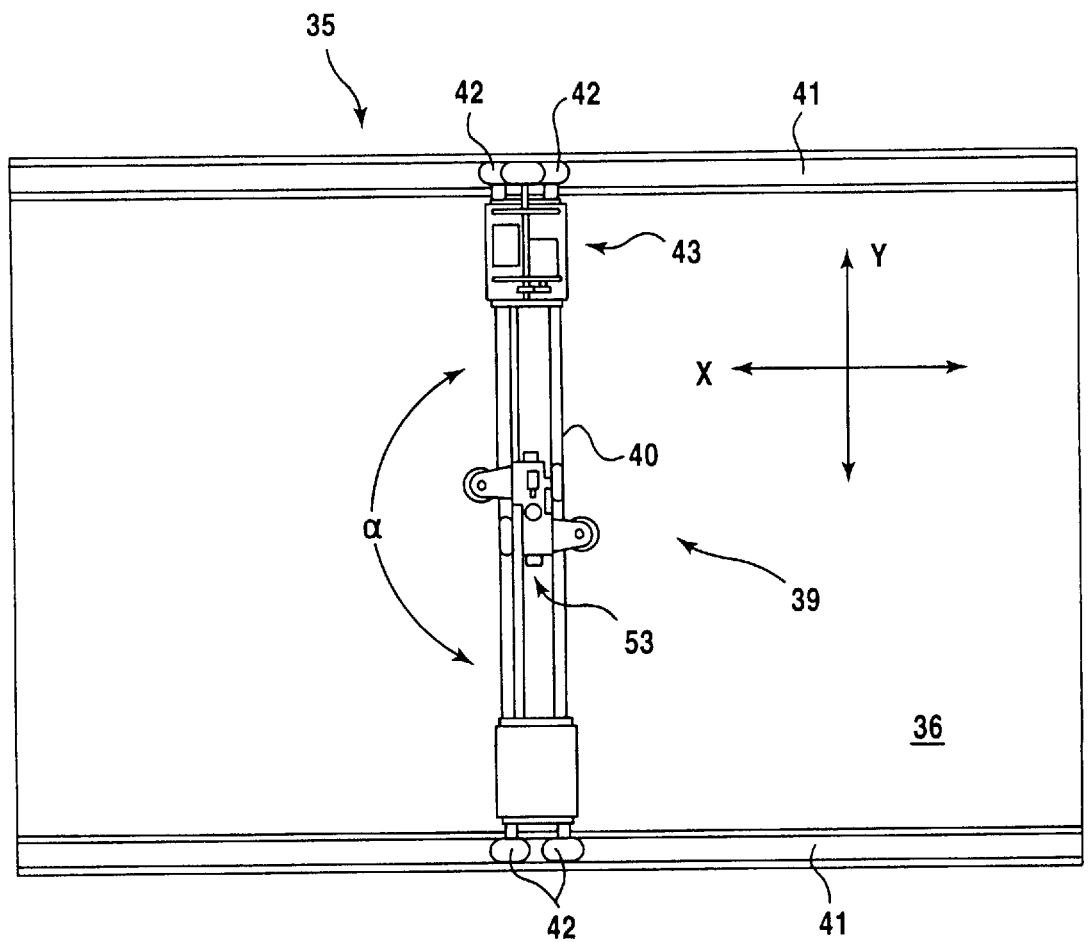
FIG. 11 is a plan view of a miniature space and camera mechanism in the same apparatus.
Figure 12:
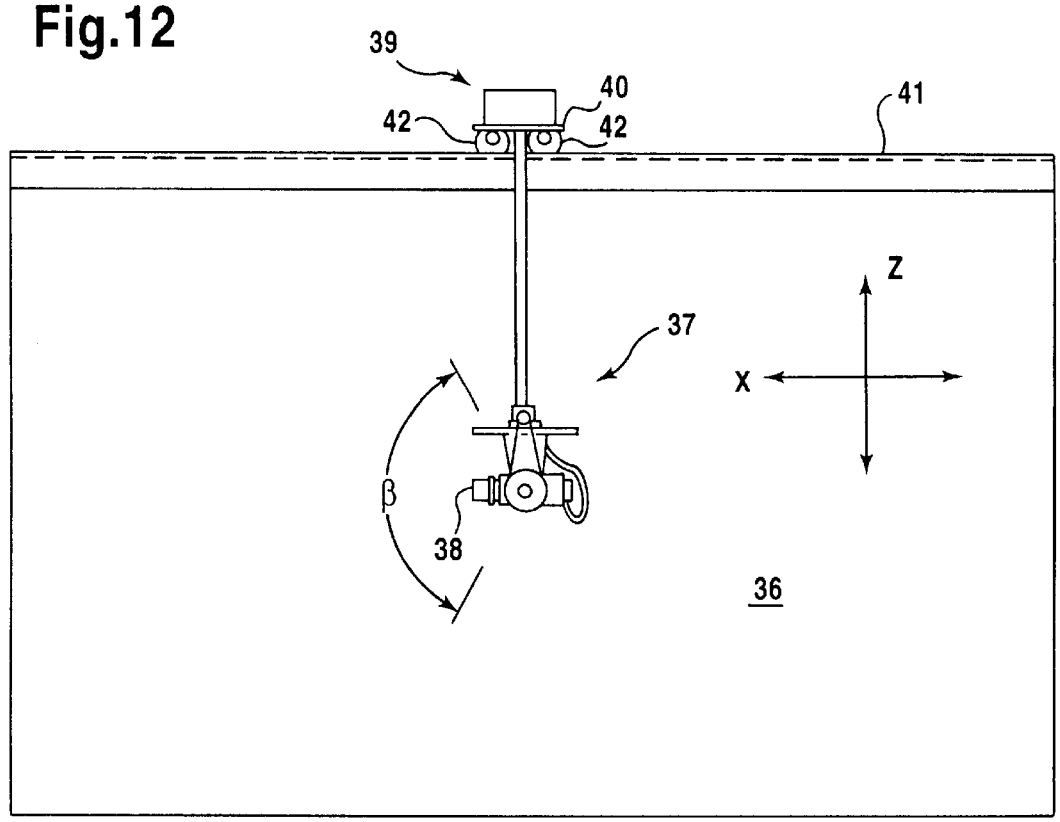
FIG. 12 is a sectional side view of the miniature space and camera mechanism.
Figure 13:
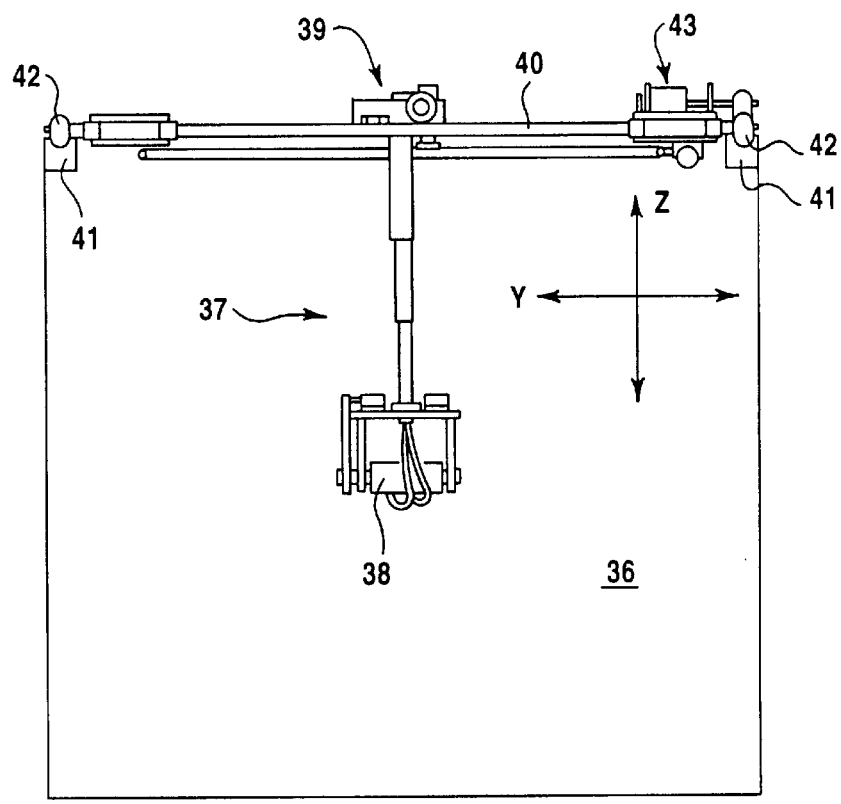
FIG. 13 is a sectional rear view of the same.
Figure 14:
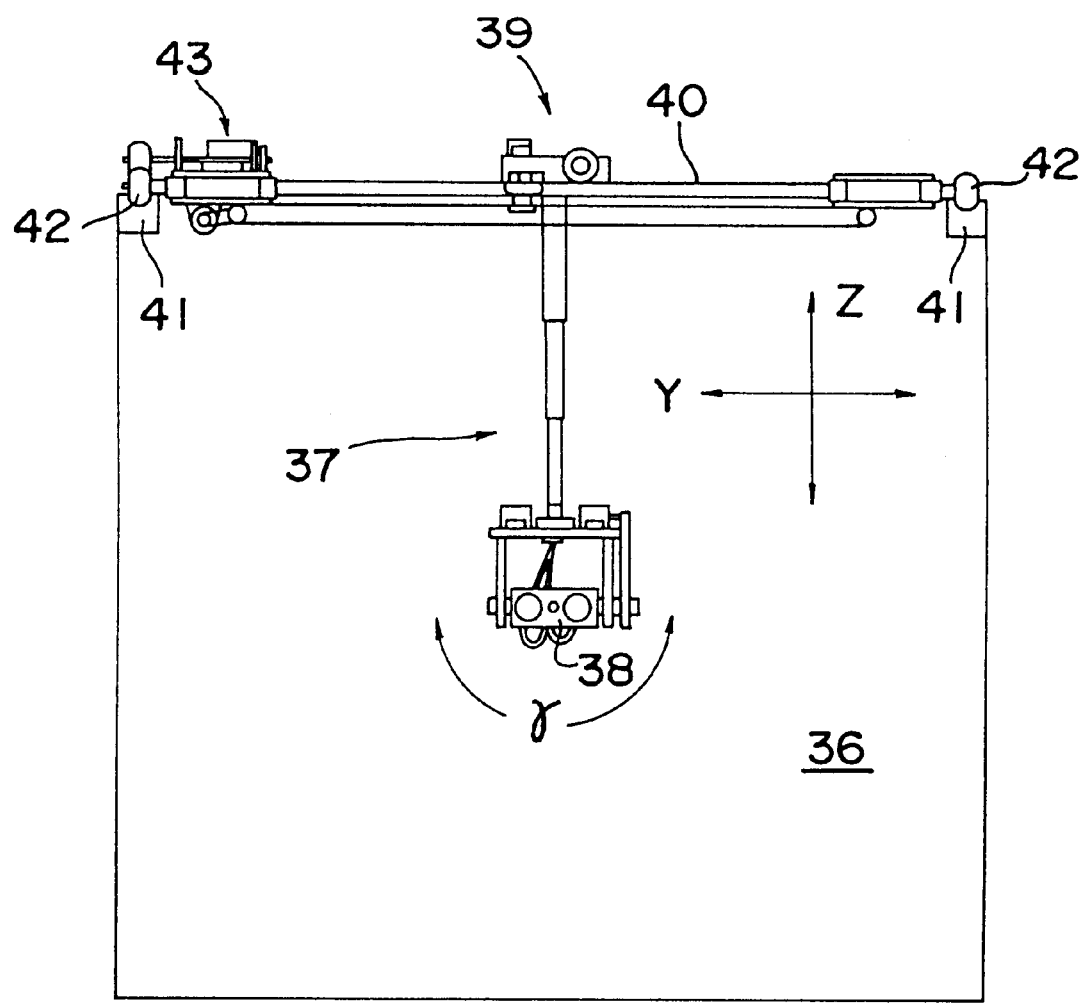
FIG. 14 is a sectional front view of the same.
Figure 19A:
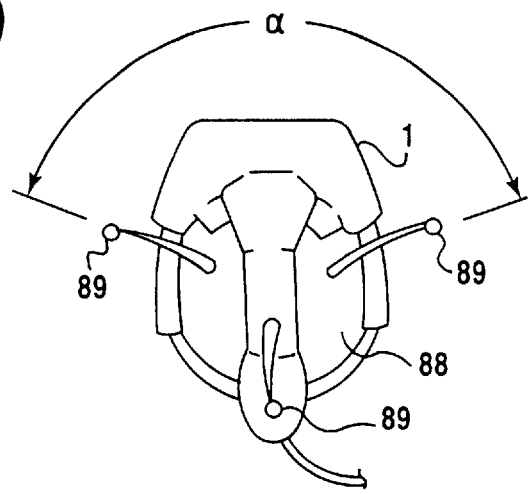
FIGS. 19(A), 19(B) and 19(C) are explanatory views showing movements of the head of a participant in use of the virtual reality simulation apparatus.
Figure 19B:
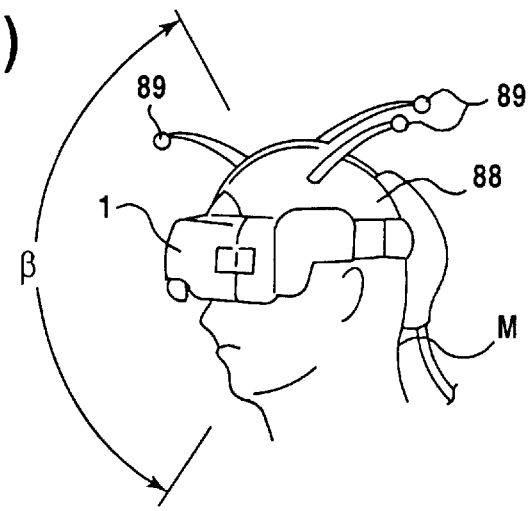
Figure 19C:
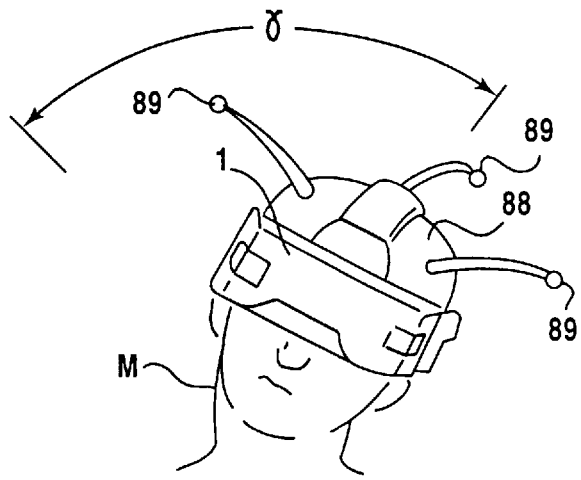

The view-direction detecting means 87 includes a plurality (three in this example) of signal transmission members 89, which are provided on a cap 88 integrally formed with the HMD 1 to transmit a particular standard signal using ultrasonic waves, line of magnetic force, infrared rays, or the like, and a plurality (three in this example) of sensors 90 which are disposed, for example, on the ceiling of the play room 2 correspondingly to arrangement of the signal transmission members 89 on the cap 88, receive the standard signals from the corresponding transmission members 89 to detect specific positions thereof. Signals detected by the sensors 90 are transmitted to the control device 4, and the control device 4 analyzes, on the basis of the detected signals, specific directions of the view of the participant M as shown in FIG. 19. The control device 4 controls the height and orientation of the camera 38 of the miniature space and camera mechanism 35 while causing the height and orientation of the camera to correspond to the analyzed view of the participant. In detail, when the head of participant M rotates leftward and rightward (rotation angle: α) as shown in FIG. 19(A), the camera 38 is controlled to correspondingly rotate leftward and rightward as seen in FIGS. 11 and FIG. 16(C). And when the participant's head rotates up and down (rotation angle: β) as shown in FIG. 19(B), the camera 38 is controlled to correspondingly rotate up and down as seen in FIGS. 12 and 16(B). The foregoing camera-drive 39 does not have a function of slantwise swinging the camera 38 (at a swing angle: γ), for example, around the lower end of the stretchable rod 68 as shown in FIG. 14. In case of providing the slantwise swinging function, the camera 38 can be slantwise swung correspondingly to the participant's head when slanted as seen in FIG. 19(C). Other features are the same as those in the first and second examples of the invention.

According to the above virtual reality simulation apparatus, when the participant watches and listens to images taken by the miniature space and camera mechanism 35 or any composite images including those images and the programmed images, the images change following or correspondingly to a change of the view of the participant M, thereby providing the participant with a quasi experience or simulation of virtual reality with more enhanced reality. Other operations and movements are the same as those in the foregoing examples of the invention.

In the above third example, the view-direction detecting means 87 may be omitted. In this case, the participant M is enabled to make walk motion or movement (which is the same as his or her actual walking) at the same position correspondingly to or following the images and also have a quasi experience of movement on slopes correspondingly to the images, enjoying the virtual reality simulation with full reality. Furthermore, a composite image including a previously programmed image and an image taken by the miniature space and camera mechanism 35 can be watched and listened to on the HMD 1. Hence, the image software is easy and cheap to produce.

The walk surface mechanism 3 may be omitted in the third example. In this case, the participant's walk motion or movement cannot be caused to correspond to the images. However, the participant M can watch and listen to the images which change correspondingly to a change of his or her view, so that the participant can have a realistic experience of virtual reality.

In those examples referred to above, the image display may employ a multi-screen 91 as shown in FIG. 20 in place of the HMD 1. In this case, the participant may see an image shown on the multi-screen 91 by putting on a special goggles 92, by which the participant is enabled to see a three-dimensional image. Otherwise, the image to be seen by the participant may be not necessarily a three-dimensional image.

Moreover, the participant M may wear an interactive terminal 93 in the form of a glove to have various interaction with the control device 4 through the interactive terminal 93, so that the participant can make communication with any virtual persons or objects in the images.

In place of the walk surface mechanism 3 in those examples, a vehicle such as an automobile in which a plurality of participants ride may be used with the corresponding number of cameras 38 of the miniature space and camera mechanism 35. The vehicle is operated by a driver to run in a predetermined space, and the cameras 38 are shifted in real time on a course in the miniature space 36 corresponding to the vehicle's movement, so that images in the miniature space 36 corresponding to specific view-directions of the participants, or any composite images including the images in the miniature space 36 and previously programmed computer-graphic images are shown on the HMDs 1 mounted on the heads of the participants.

Figure 21A:
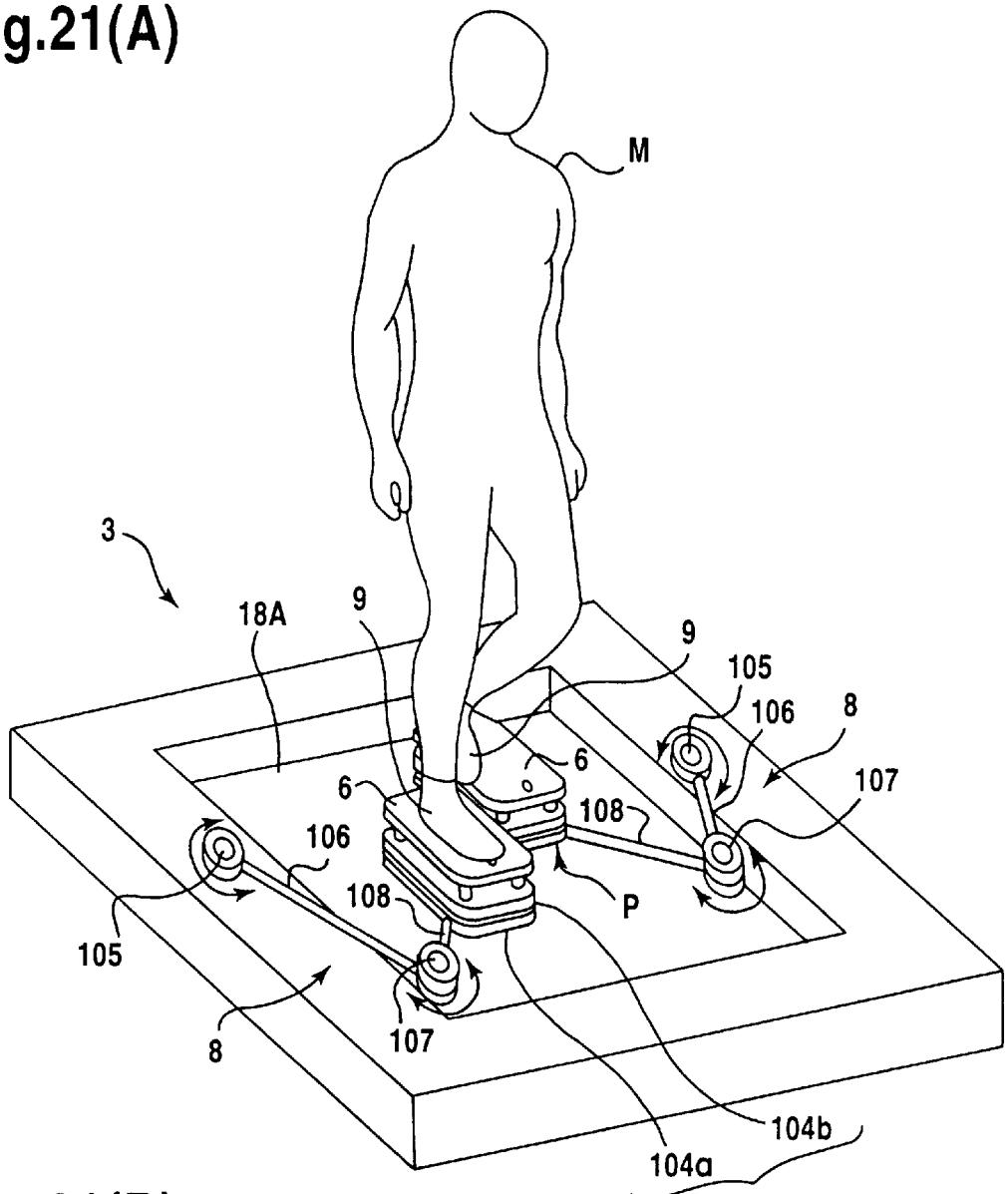
FIG. 21(A) is a perspective view showing a walk surface mechanism in another example, and FIG. 21(B) a plan view of a principal portion of the walk surface mechanism.
Figure 21B:
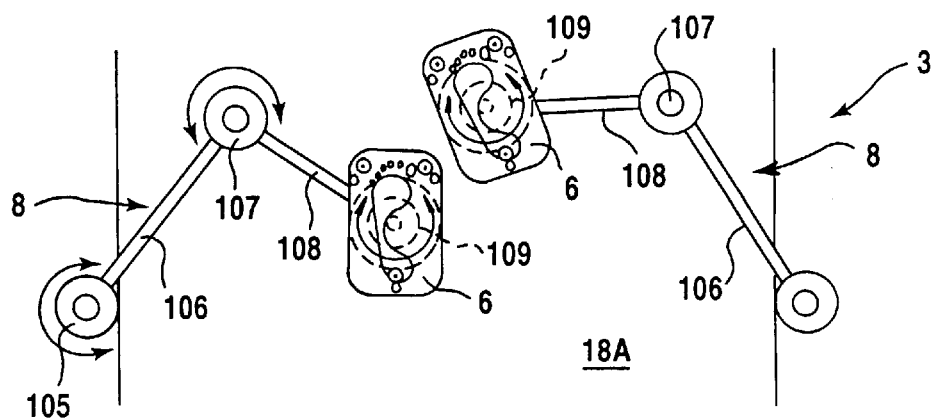
Figure 22:
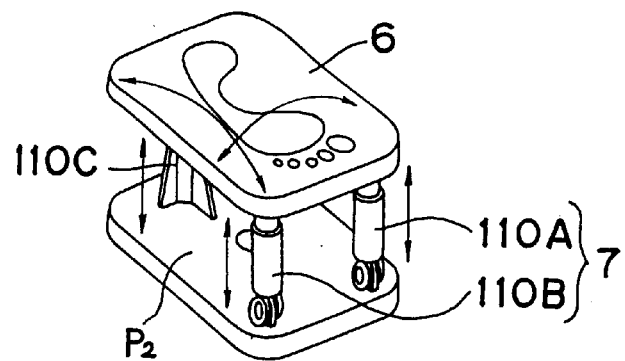
FIG. 22 is a perspective view of a walk plate support base in the walk surface mechanism.
Figure 23:
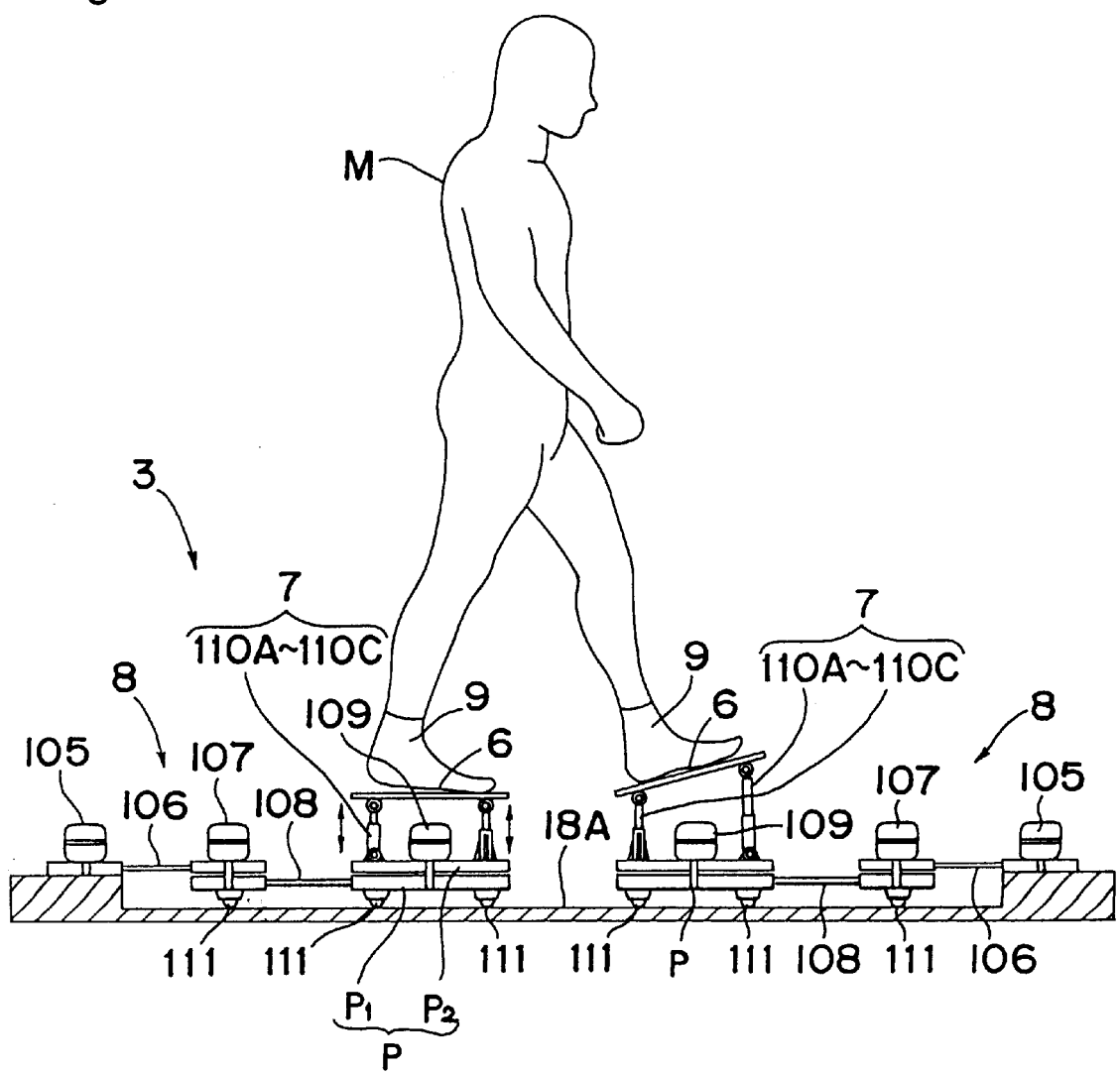
FIG. 23 is a longitudinal section of the walk surface mechanism.

Furthermore, the walk surface mechanism 3 may be structured as shown in FIGS. 21 to 23. In the walk surface mechanism 3 a pair of walk plates 6 are arranged in a shallow pit 18A formed on the floor and are supported by support bases P. The support bases P are movable horizontally by use of a walk-plate horizontally-driving means 8 including a linkage mechanism (a bendable linkage mechanism). The linkage mechanism forming the horizontally-driving means 8 comprises a first rotation cylinder 105 on the mouth edge of the pit 18A, a first arm 106 swingable by the rotation cylinder 105, a second rotation cylinder 107 at a remote end of the arm 106 and a second arm 108 connecting the rotation cylinder 107 with the walk-plate support base P. In the horizontally-driving means 8, the rotation cylinders 105 and 107 are controlled to rotate so that the arms 106 and 108 are swung to horizontally shift the walk-plate support bases P in the pit 18A. Free rollers 111 are provided on the bottom surfaces of the joint or connecting parts of the arms 106, 108 and at the bottoms of the support bases P for making smooth the horizontal movement of the support bases supporting the walk plates.

The support base P includes a lower base P1 directly connected to the second arm 108 and an upper base P2 mounted on the lower base P1 in a manner of being freely rotatable. The upper base P2 is driven, by a third rotation cylinder 109 mounted thereon, to rotate with respect to the lower base P1. The walk plate 6 is supported on the upper base P2 by three raising-lowering cylinders 110A, 110B, 110C. Hence, the walk plate 6 may be slanted by adjusting the height of the two fore cylinders 110A and 110B and the hind one 110C. That is, the raising-lowering cylinders 110A, 110B, 110C form a slantwise-driving means 7 for the walk plates. Furthermore, the two fore cylinders 110A and 110B may be caused to differ in height from each other to slant the walk plates 6 widthwise. And all the raising-lowering cylinders 110A, 110B, 110C may be raised or lowered by a predetermined level at a time to make simulation of walking on steps. Moreover, the rotation cylinder 109 on the upper base P2 is driven to rotate, so that the walk plate 6 can be rotated on the support base P. Other features in this example are the same as those of the walk surface mechanism 3 in the foregoing examples.

What is claimed is:

1. A virtual reality simulation apparatus comprising:
    an image display showing participants programmed images;
    a walk surface mechanism for detecting a foot-bottom position of a participant, and for performing a horizontal walk simulation in which a pair of walk plates, on which left and right feet of the participant are placed separately, are individually horizontally shifted forward, backward, leftward and rightward, a simulation of walk on slopes in which the pair of walk plates are individually slanted, and a simulation of walk on steps in which the pair of walk plates are individually raised or lowered; and
    a control device which transmits the programmed images to the image display and controls the walk surface mechanism while causing the walk surface mechanism to correspond to the programmed images,
    wherein the walk surface mechanism is provided with a foot bottom-position detecting means which is for detecting specific positions of the participant's feet-bottoms and includes a signal transmission member provided on each shoe associated with each foot of the participant and a sensor provided on each of the walk plates to receive a signal from the signal transmission member.

2. A virtual reality simulation apparatus as set forth in claim 1, wherein the display is a head-mounted display to be mounted on the head of a participant.

3. A virtual reality simulation apparatus as set forth in claim 1, wherein the walk surface mechanism includes left and right walk plates and a walk-plate drive connected to and supporting the walk plates.

4. A virtual reality simulation apparatus as set forth in claim 3, wherein the walk-plate drive is arranged in a pit formed on a floor of a play room.

5. A virtual reality simulation apparatus as set forth in claim 3, wherein each of the walk plates has a foot-position regulating frame for regulating the participant's feet in a predetermined position.

6. A virtual reality simulation apparatus as set forth in claim 3, wherein the walk-plate drive includes a horizontally-driving means for shifting each of the left and right walk plates individually and horizontally forward, backward, leftward and rightward, a slantwise-driving means for slanting each of the left and right walk plates individually and slantwise forward, backward, leftward and rightward, and a raising and lowering means for raising and lowering each of the left and right walk plates individually.

7. A virtual reality simulation apparatus as set forth in claim 6, wherein the raising and lowering means for the walk plates employs a raising and lowering cylinder which changes the height of the left and right walk plates individually.

8. A virtual reality simulation apparatus as set forth in claim 6, wherein the horizontally-driving means comprises a rotation cylinder fit to a piston rod of the raising and lowering means, a swinging cylinder for swinging the raising and lowering means forward and backward, and a swinging cylinder for swinging the raising and lowering means leftward and rightward.

9. A virtual reality simulation apparatus as set forth in claim 6, wherein the slantwise-driving means comprises a longitudinally swinging cylinder and a widthwise swinging cylinder for swinging the walk plates in their longitudinal direction and widthwise respectively.

10. A virtual reality simulation apparatus as set forth in claim 1, wherein the signal transmission member is provided at plural points on each walk plate.

11. A virtual reality simulation apparatus as set forth in claim 1, wherein the signal transmission member employs a signal transmission member transmitting an ultrasonic signal.

12. A virtual reality simulation apparatus as set forth in claim 1, wherein the walk surface mechanism includes a walk base plate freely tilted, the walk plates held by the walk base plate and being freely horizontally shiftable and rotatable, and a walk-plate slantwise-driving means which supports one end of the walk base plate.

13. A virtual reality simulation apparatus as set forth in claim 1, wherein the walk surface mechanism includes the walk plates, a walk-plate support base supporting each walk plate, and a walk-plate horizontally-driving means for horizontally shifting the walk-plate support bases, the horizontally-driving means including a bendable linkage mechanism and a rotation cylinder disposed at a joint in the linkage mechanism.

14. A virtual reality simulation apparatus comprises:
    an image display showing images to participants;

a miniature space and camera mechanism provided with a miniature space imitating a space in which a participant moves virtually, and with a camera device which is freely shifted in the miniature space to be placed in a direction imitating a view of the participant and take an image in the miniature space;

a walk surface mechanism to simulate movement of the participant, the walk surface mechanism including a pair of walk plates and a foot bottom detecting means including a signal transmission member provided in each shoe used by the participant and a sensor in each of the walk plates, for detecting positions of feet-bottoms of the participant moved away from the walk plates; and a control device which transmits to the image display a previously programmed image, an image taken by the miniature space and camera mechanism or a composite image including the programmed image and the image taken by the miniature space and camera mechanism and controls the walk surface mechanism to correspond to the images.

15. A virtual reality simulation apparatus as set forth in claim 14, wherein the image display is a head-mounted display to be mounted on the head of a participant.

16. A virtual reality simulation apparatus comprises:

an image display showing images to participants;

a walk surface mechanism including a pair of walk plates, which are shiftable at least forward, backward, leftward and rightward and support feet of a participant, a foot bottom-position detecting means, including a signal transmission member provided in each shoe used by the participant and a sensor in each of the walk plates, for detecting positions of feet-bottoms of the participant moved away from the walk plates, a walk-plate horizontally-driving means, which shifts the walk plate to allow the foot-bottom of the participant to be placed in a predetermined position and direction on the walk plate and pulls back the walk plate, on which the foot-bottom has trodden or been contacted, toward a trunk of the participant correspondingly to kinds of exercises such as walk and running to keep the participant's trunk in a fixed or constant position, and a walk-plate slantwise-driving means which slants the walk plates to provide simulation of movement on slopes;

a miniature space and camera mechanism including a miniature space imitating a space in which the participant moves virtually, and a camera device which is freely movable in the miniature space to be placed in a direction imitating a view of the participant and take an image in the miniature space; and a control device which transmits to the image display a previously programmed image, an image taken by the miniature space and camera mechanism or a composite image including the programmed image and the image taken by the miniature space and camera mechanism, and controls the walk surface mechanism while causing the same to correspond to the images.

17. A virtual reality simulation apparatus as set forth in claim 16, wherein the image display is a head-mounted display to be mounted on the head of the participant.

18. A virtual reality simulation apparatus as set forth in claim 16, wherein the walk surface mechanism has a walk-plate raising and lowering means for raising and lowering the walk plates individually to provide simulation of movement on steps.

19. A virtual reality simulation apparatus as set forth in claim 16, wherein the walk surface mechanism has a walk-plate raising and lowering means for raising and lowering the walk plates individually to provide simulation of movement on steps.

20. A virtual reality simulation apparatus comprises:

an image display showing images to participants;

a view-direction detecting means for detecting specific directions of views of a participant;

a miniature space and camera mechanism including a miniature space imitating a space in which the participant moves virtually, and a camera device which is freely movable in the miniature space to be placed in a direction imitating a view of the participant and take an image in the miniature space;

a walk surface mechanism to simulate movement of the participant, the walk surface mechanism including a pair of walk plates and a foot bottom detecting means, including a signal transmission member provided in each shoe used by the participant and a sensor in each of the walk plates, for detecting positions of feet-bottoms of the participant moved away from the walk plates; and a control device which transmits to the image display a previously programmed image, an image taken by the miniature space and camera mechanism or a composite image including the programmed image and the image taken by the miniature space and camera mechanism and controls the walk surface mechanism to correspond to the images.

21. A virtual reality simulation apparatus as set forth in claim 20, wherein the view-direction detecting means comprises a plurality of signal transmission members provided on a cap to be mounted on the head of the participant, and a plurality of sensors which are disposed above the head of the participant correspondingly to arrangement of the signal transmission members to receive signals from the corresponding signal transmission members.

22. A virtual reality simulation apparatus as set forth in claim 21, wherein the image display is a head-mounted display to be mounted on the head of the participant.

23. A virtual reality simulation apparatus as set forth in claim 20, wherein the image display is a multi-screen.

* * * * *